(12) United States Patent
Tsunemi et al.

(10) Patent No.: US 6,524,206 B2
(45) Date of Patent: Feb. 25, 2003

(54) DRIVING UNIT THAT COMPRISES A HYDRAULIC MOTOR AND A REDUCTION GEAR

(75) Inventors: Masahiro Tsunemi, Kobe (JP); Hidekazu Okufuji, Kobe (JP)

(73) Assignee: Nabco Ltd., Hyogo (JP)

( * ) Notice: Subject to any disclaimer, the term of this patent is extended or adjusted under 35 U.S.C. 154(b) by 0 days.

(21) Appl. No.: 09/941,823

(22) Filed: Aug. 29, 2001

(65) Prior Publication Data

US 2002/0034998 A1 Mar. 21, 2002

(30) Foreign Application Priority Data

| Aug. 29, 2000 | (JP) | 2000-258565 |
| Nov. 16, 2000 | (JP) | 2000-349548 |
| Nov. 16, 2000 | (JP) | 2000-349549 |
| Jan. 31, 2001 | (JP) | 2001-022758 |
| Jan. 31, 2001 | (JP) | 2001-022759 |
| Jul. 5, 2001 | (JP) | 2001-204759 |
| Jul. 6, 2001 | (JP) | 2001-205774 |

(51) Int. Cl.$^7$ ............................................. F16H 47/04
(52) U.S. Cl. ........................................................... 475/83
(58) Field of Search .............................. 180/308; 475/83

(56) References Cited

U.S. PATENT DOCUMENTS

| 5,058,383 A | 10/1991 | Tsunemi et al. ............... 60/493 |
| 5,928,099 A | 7/1999 | Tsunemi ...................... 475/83 |

FOREIGN PATENT DOCUMENTS

| JP | 4-140538 | 5/1992 |
| JP | 6-249297 | 9/1994 |
| JP | 8-247223 | 9/1996 |
| JP | 9-240525 | 9/1997 |

OTHER PUBLICATIONS

Patent Abstracts of Japan, Publication No. 04–140538, Publication date May 14, 1992, 1 page.
Patent Abstracts of Japan, Publication No. 09–240525, Publication date Sep. 16, 1997, 1 page.
Patent Abstracts of Japan, Publication No. 06–249297, Publication date Sep. 06, 1994, 1 page.
Patent Abstracts of Japan, Publication No. 08/247223, Publication date Sep. 24, 1996, 1 page.

*Primary Examiner*—Dirk Wright
(74) *Attorney, Agent, or Firm*—Rosenthal & Osha L.L.P.

(57) ABSTRACT

The present invention relates to a driving unit comprising a multiple-stage planetary gear type reducer used to reduce rotation speed of a hydraulic motor and output the reduced rotation speed, which is used as a driving device for a traveling apparatus. The driving unit of the present invention is so structured that a trunnion boss for rotatably supporting a planetary gear train of a final state is supported at opposite ends thereof. This structure enables the load applied to the trunnion boss to be dispersed to the both ends, and as such can allow the trannion boss to be reduced in diameter or can allow the fixed casing to be reduced in circumferential dimension. This can produce a downsized driving unit. The present invention has additional features, such as the feature that an output shaft of the hydraulic motor and an input shaft of the reducer are formed in the form of a single rotating shaft. This can provide a driving unit structurally optimized for every principal part, to provide downsizing and improved durability.

15 Claims, 27 Drawing Sheets

Fig. 15 (a)
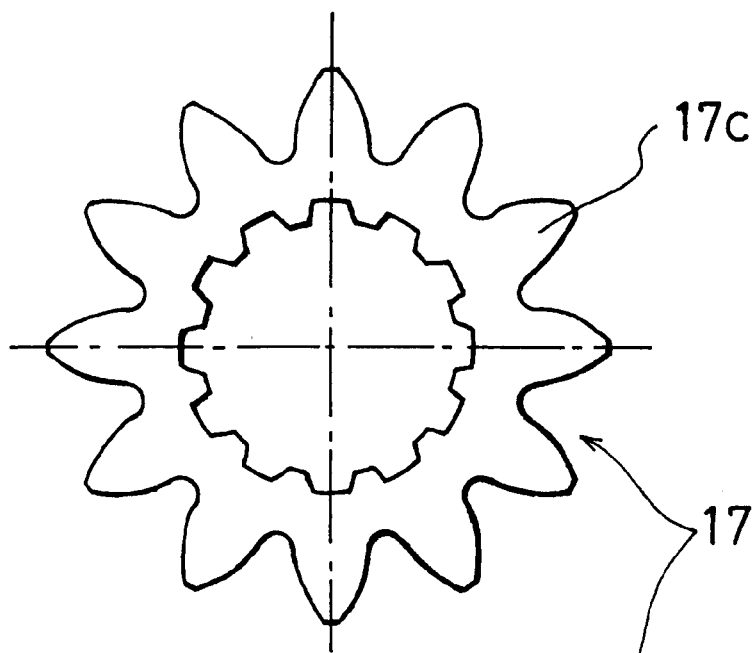
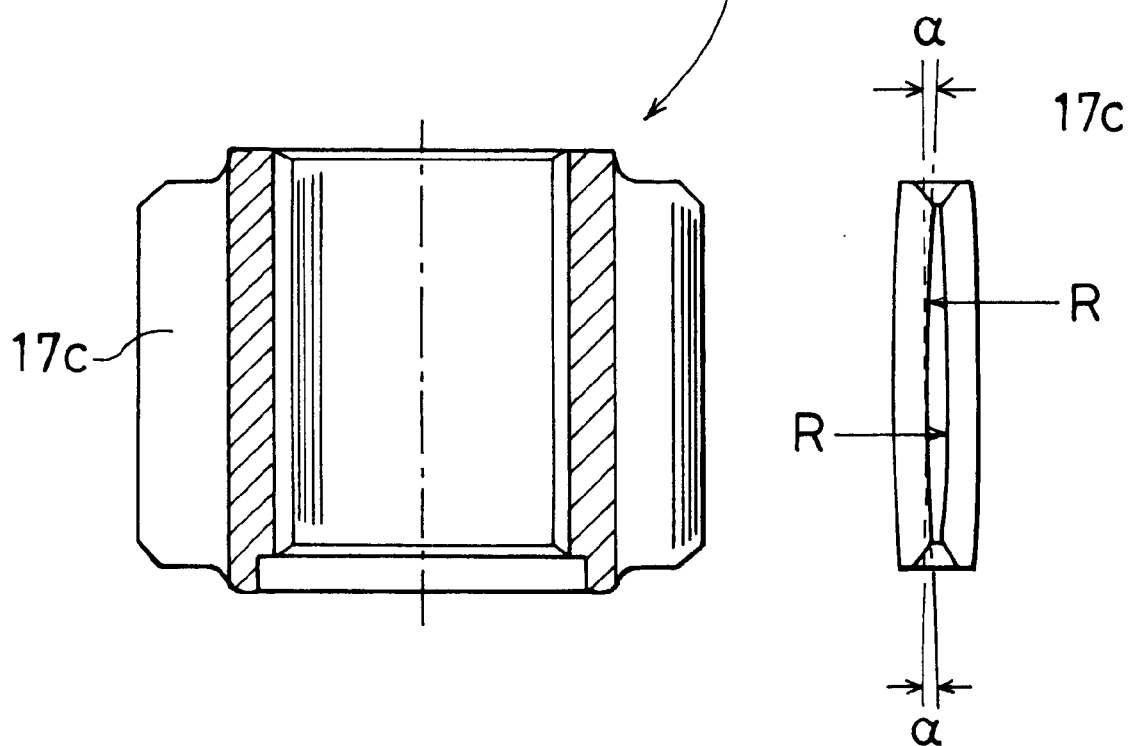
Fig. 15 (b)   Fig. 15 (c)

DRIVING UNIT THAT COMPRISES A HYDRAULIC MOTOR AND A REDUCTION GEAR

BACKGROUND OF THE INVENTION

1. Technical Field of the Invention

The present invention relates to a driving unit used to reduce rotation speed of a hydraulic motor and output the reduced rotation speed, which is used as a driving device for a traveling apparatus.

2. Description of the Prior Art

A driving unit is used as a driving device of a construction machine traveled by a crawler as typified particularly by a driving device of a hydraulic shovel among construction machines. In the driving unit, a hydraulic motor is disposed in an interior of a fixed casing fixed to a vehicle body, so that the rotation as output is transmitted to a rotating casing concentrically fitted to the fixed casing to freely rotate through a planetary gear mechanism, so as to drive the crawler by means of a sprocket disposed around a periphery of the rotating casing. Because of the constraint that the driving unit is located in the interior of the crawler, there is a restriction on the entire inner configuration space, for the reason of which the driving unit is required to have small size and high power.

The driving units of this type are known by publications such as Japanese Laid-open (Unexamined) Patent Publications No. Hei 4-140538, No. Hei 6-249297, Hei 8-247223 and No. Hei 9-240525.

However, the driving units of this conventional type are all being demanded to be further downsized.

It is the object of the present invention to provide a driving unit structurally optimized for every principal part, to provide downsizing and improved durability.

SUMMARY OF THE INVENTION

In accordance with a 1st aspect of the invention, there is provided a driving unit comprising a fixed casing having a hydraulic motor therein; a rotating casing rotatably supported around a periphery of the fixed casing via a bearing inserted from one end portion of the fixed casing and having an internal gear around an inside thereof; a sun gear mounted on an output shaft projected from the hydraulic motor toward the one end portion of the fixed casing; a planetary gear train disposed between the sun gear and the internal gear to reduce speed in two or more stages; a trunnion boss, integrally projected from the one end portion of the fixed casing, for rotatably supporting the planetary gear train of a final stage engaging with the internal gear; a holder in which a front end portion of the trunnion boss is inserted; support pillars projecting from the holder toward the fixed casing; and fastening means for fixing the support pillars and the fixed casing.

Known as a conventional driving unit is the one disclosed by Japanese Laid-open (Unexamined) Patent Publication No. Hei 4(1992)-140538, for example. A typical conventional driving unit 101 is shown in FIG. 25. The driving unit 101 has a cylindrical fixed casing 102 in which a hydraulic motor 103 is disposed. An output shaft 104a of the hydraulic motor 103 is coupled with an input shaft 104b via a spline coupling 117, and a sun gear 105 is mounted on a front end portion of the input shaft 104b. A rotating casing 107 is rotatably supported around a periphery of the fixed casing 102 via a bearing 106, and an internal gear 108 is formed around an inside of the rotating casing 107. The rotation of the sun gear 105 is transmitted to the internal gear 108 through a planetary gear 109, a second sun gear 111 engaged with a planetary gear frame 110 of the planetary gear 109, and a second planetary gear 113 supported on a trunnion boss 112 projected from the front end portion of the fixed casing 102, to rotate the rotating casing 107 at a reduced speed. A flange 114 of the fixed casing 102 is bolted to the body (not shown), and a flange 115 of the rotating casing 107 is bolted to a crawler sprocket (not shown).

The driving torque of the hydraulic motor 103 fixedly mounted in the fixed casing 102 is reduced via a planetary gear train of the first stage comprising the sun gear 105 and the planetary gears 109 and a planetary gear train of the second stage comprising a second sun gear 111 and second planetary gears 113 and is transmitted to the rotation of the rotating casing 107.

However, since the trunnion boss 112 for rotatably supporting the second planetary gears 113 is projected from the end of the fixed casing 102 in a cantilever fashion, a bending stress is generated at the basal end of the trunnion boss 112 when a load is applied thereto through the second planetary gears 113. For this reason, the trunnion boss 112 is required to have a large thickness. As a result of this, the bearing 106 and the floating seal 116 inserted from the trunnion boss 116 side of the fixed casing 102 are increased in size, which causes the rotating casing 107 to increase in size and in turn causes the entire driving unit 101 to increase in radial dimension.

According to the construction of the 1st aspect of the invention, the trunnion boss is allowed to be supported at opposite ends thereof by the holder fixed to the fixed casing through the support pillars. This enables the load applied to the trunnion boss to be dispersed to the holder and the fixed casing, and as such can allow the trannion boss to be reduced in diameter or can allow the fixed casing to be reduced in circumferential dimension. This produces the result that the rotating casing supported around the periphery of the fixed casing by the bearing inserted thereon is also reduced in outer diameter. Also, the support pillars projected from the holder have thickness such that even when the holder body is small in thickness, the fastening means to be fixed to the fixed casing applies a sufficient fastening force at the support pillars. This enables the support of the planetary gear train for rotation, without any axial elongation and with good durability. Thus, the downsizing of the driving unit can be achieved and improved durability can also be provided.

In accordance with a 2nd aspect of the invention, there is provided a driving unit according to 1st aspect of the invention, wherein the support pillars are in abutment with support pillars projected from the fixed casing at their abutment surfaces, which are located within a width of the planetary gear of the final stage.

This construction enables the abutment surfaces to be away from the basal ends of the support pillars to which a maximum bending moment is applied, by projecting the support pillars from the fixed casing side as well.

In accordance with a 3rd aspect of the invention, there is provided a driving unit according to 1st aspect of the invention, wherein the trunnion boss is projected along a periphery of the fixed casing and a rounded portion is formed at a basal end of the trunnion boss except an area close to the periphery of the fixed casing.

According to this construction, since the direction of the load acting on the trunnion boss is a tangent direction to the fixed casing, the fixed casing can be reduced in circumferential diameter by forming no rounded portion for relaxing the bending stress at the basal end of the trunnion boss located around the periphery of the fixed casing.

In accordance with a 4th aspect of the invention, there is provided a driving unit according to 1st aspect of the invention, wherein the abutment surfaces are located at an approximately widthwise center portion of the planetary gear of the final stage.

This construction can allow the abutment surfaces to be located at an approximately axial center of the support pillar at which a bending moment is minimized. Also, this construction can ensure a dimension from underhead of the bolt used as the fastening means to the abutment surfaces.

In accordance with a 5th aspect of the invention, there is provided a driving unit comprising a fixed casing having a hydraulic motor therein; a rotating casing rotatably supported around a periphery of the fixed casing via a bearing inserted from one end portion of the fixed casing and having an internal gear around an inside thereof; a sun gear mounted on an output shaft projected from the hydraulic motor toward the one end portion of the fixed casing; a planetary gear train disposed between the sun gear and the internal gear to reduce speed in two or more stages; a trunnion boss, supported at the one end portion of the fixed casing, for rotatably supporting the planetary gear train of a final stage engaging with the internal gear; a holder in which a front end portion of the trunnion boss is inserted; support pillars projecting from the holder toward the fixed casing; and fastening means for fastening the support pillars and the fixed casing, wherein the support pillars are in abutment with support pillars projected from the fixed casing at their abutment surfaces, which are located within a width of the planetary gear of the final stage.

According to this construction, the trunnion boss is allowed to be supported at opposite ends thereof by the fixed casing and the holder fixed to the fixed casing through the support pillars. This enables the load applied to the trunnion boss to be dispersed to the holder and the fixed casing, and as such can allow the trannion boss to be reduced in diameter or can allow the fixed casing to be reduced in circumferential dimension. This produces the result that the rotating casing supported around the periphery of the fixed casing by the bearing inserted thereon is also reduced in outer diameter. Also, since the abutment surfaces at which the support pillars projected from the holder and the support pillars projected from the fixed casing are in abutment are within the width of the planetary gear of the final stage, the support pillars projected from the holder have thickness such that even when the holder body is small in thickness, the fastening means to be fixed to the fixed casing applies a sufficient fastening force at the support pillars. This enables the support of the planetary gear train for rotation, without any axial elongation and with good durability. Also, by projecting the support pillars from the fixed casing side as well, the abutment surfaces can be allowed to be away from the basal ends of the support pillars to which a maximum bending moment is applied. Thus, the downsizing and improved durability of the driving unit can be achieved.

In accordance with a 6th aspect of the invention, there is provided a driving unit according to 5th aspect of the invention, wherein the abutment surfaces are located at an approximately widthwise center portion of the planetary gear of the final stage.

This construction can allow the abutment surfaces to be located at an approximately axial center of the support pillar at which a bending stress is minimized. Also, this construction can ensure a dimension from underhead of the bolt used as the fastening means to the abutment surfaces.

In accordance with a 7th aspect of the invention, there is provided a driving unit comprising a hydraulic motor and a planetary gear type of reducer to reduce an output of the hydraulic motor and transmit the reduced output to a driving portion, wherein an output shaft portion of the hydraulic motor and an input shaft portion of the reducer are integrally formed in the form of a single rotating shaft; wherein a sun gear of the reducer is put in spline engagement with a front end portion of the rotating shaft; and wherein the spline is so formed that a clearance therebetween can gradually broaden toward the end thereof With the conventional type of driving unit 101, since the output shaft 104*a* and the input shaft 104*b* are coupled with the coupling 117 using the spline engagement, the driving unit is increased in radial dimension as well as in axial length at that coupling part.

In contrast to this, with the construction of the 7th aspect of the invention, since the rotating shaft can be used both as the input shaft and as the output shaft by projecting the output shaft of the hydraulic motor beyond the center of the reducer, no intermediate coupling is required, thus enabling the radial thickness of the rotating shaft to be optimized. The rotating shaft is journaled by two bearings in the hydraulic motor at two lengthwise locations thereof. When pressure is introduced into the cylinder block, the rotating shaft is subject to a bending load at its portion between the two bearings, so that the front end portion of the rotating shaft is inclined. However, since the spline cogs of the rotating shaft are formed in a crowning fashion or a like fashion so that it can gradually narrow toward the front end to produce a clearance gradually broadened toward the front end, so as to ensure the clearance corresponding to the inclination of the rotating shaft. This can allow the rotating shaft to surface-contact with the sun gear to transmit the running torque of the rotating shaft to the sun gear smoothly.

In accordance with a 8th aspect of the invention, there is provided a driving unit according to 7th aspect of the invention, wherein spline grooves are formed around an inside of the sun gear so that they are each located at an approximately circumferential center between adjacent spaces between cogs formed around a periphery of the sun gear.

According to this construction, since the spaces between the cogs of the sun gear and the spline grooves at the fitting portions between the sun gear and the rotating shaft are out of position from each other with respect to the circumferential direction, even when the sun gear is reduced in diameter, the wall thickness of the sun gear can be ensured.

In accordance with a 9th aspect of the invention, there is provided a driving unit comprising a hydraulic motor and a planetary gear type of reducer to reduce an output of the hydraulic motor and transmit the reduced output to a driving portion, wherein an output shaft portion of the hydraulic motor and an input shaft portion of the reducer are integrally formed in the form of a single rotating shaft; wherein a sun gear of the reducer is mounted on a front end portion of the rotating shaft; and wherein at least one of a planetary gear engaging with the sun gear and the sun gear have cogs which are so formed that a clearance therebetween can gradually broaden toward the end thereof.

According to this construction, since the rotating shaft can be used both as the input shaft and as the output shaft by projecting the output shaft of the hydraulic motor beyond the center of the reducer, no intermediate coupling is required, thus enabling the radial thickness of the rotating shaft to be optimized. Also, the sun gear and/or the planetary gears allow for the clearance corresponding to the inclination of the rotating shaft, so that the surface-contact between these gears is ensured.

In accordance with a 10th aspect of the invention, there is provided a driving unit according to 8th aspect of the invention, wherein a distance between P and a tangent line touching one tooth flank of the sun gear at a point and extending perpendicularly to an axis of the sun gear is set at a value of not less than and asymptotic to 2 ι sin θ when the reducer is in an unloaded state:

where δ is a maximum radial variation of the sun gear caused by inclination of the rotating shaft; θ is an angle formed by the tangent line and a moving direction of the sun gear in such a positional relationship that when the rotation shaft is inclined, the one tooth flank of the sun gear which is on the opposite side to the other tooth flank of the sun gear which is put into engagement with the planetary gear comes nearest to a confronting tooth flake of the planetary gear; and P is a point on the tooth flank of the planetary gear closest to the sun gear.

According to this construction, even when the rotating shaft is inclined, the sun gear and the planetary gears can be prevented from colliding with each other at a tooth flake on the opposite side to a tooth flake at which they are engaged with each other.

In accordance with a 11th aspect of the invention, there is provided a driving unit comprising a hydraulic motor and a planetary gear type of reducer to reduce an output of the hydraulic motor and transmit the reduced output to a driving portion, the driving unit comprising a sun gear coupled with an output shaft portion of the hydraulic motor, planetary gears engaging with the sun gear, and an internal gear engaging with the planetary gears and formed around an inside of a rotating casing of the reducer, wherein a length of pass of contact of the internal gear is shortened so that an engaging area between the planetary gears and the sun gear can be equal in durable period to that between the internal gear and the sun gear.

This construction can allow the internal gear to reduce in length, and as such can allow the rotating casing to be reduced in size. Thus, the internal gear and the casing can be reduced in weight and further the costs for hardening treatment of the internal gear can be cut.

In accordance with a 12th aspect of the invention, there is provided a driving unit comprising a fixed casing having a hydraulic motor therein; a rotating casing rotatably supported around a periphery of the fixed casing via a bearing inserted from one end portion of the fixed casing and having an internal gear around an inside thereof; a sun gear mounted on an output shaft projected from the hydraulic motor toward the one end portion of the fixed casing; and a planetary gear train disposed between the sun gear and the internal gear to reduce speed, wherein at least one stage of the planetary gear train has two planetary gears symmetrically disposed about the output shaft and a planetary gear frame for rotatably supporting the two planetary gears at both axial ends thereof in sandwich relation, the planetary gear frame having a pair of flat plate portions for supporting the two planetary gears in sandwich relation and support pillars for connecting between the pair of flat plate portions, the support pillars being partially extended along a periphery of the flat plate portions and disposed near the planetary gears.

In general, the driving unit having three planetary gears arranged in regular triangle, as disclosed by Japanese Laid-open (Unexamined) Patent Publication No. Hei 8(1996)-247223, for example, is in wise use, in term of the stable support configuration. At present, it can be said that it has reached a critical limit for the structure having the three planetary gears to further reduce parts count and downsizing of the components.

The construction according to the 12th aspect of the invention can produce the driving unit with two planetary gears having a structural stability. Hence, as compared with the conventional type of driving unit having three planetary gears, parts count can be reduced to a large extent and also the structure can be simplified. Hence, the driving unit having an advantage in cost can be produced.

In accordance with a 13th aspect of the invention, there is provided a driving unit according to 12th aspect of the invention, wherein the flat plate portions are formed into a generally ellipse-like shape.

This construction enables the components of the driving unit comprising the two planetary gears to be further reduced in size and weight by forming the planetary gear frame into an ellipse-like shape.

In accordance with a 14th aspect of the invention, there is provided a driving unit comprising a fixed casing having a hydraulic motor therein; a rotating casing rotatably supported around a periphery of the fixed casing via a bearing inserted from one end portion of the fixed casing and having an internal gear around an inside thereof; a sun gear mounted on an output shaft projected from the hydraulic motor toward the one end portion of the fixed casing; a planetary gear train disposed between the sun gear and the internal gear to reduce speed in two or more stages; a trunnion boss, disposed at the one end portion of the fixed casing, for rotatably supporting the planetary gear train of a final stage engaging with the internal gear; a holder in which a front end portion of the trunnion boss is inserted and which is mounted on the fixed casing; a nut threadedly engaged with the periphery of the fixed casing to position the bearing with respect to an axial direction of the fixed casing; and a key plate for locking the nut against rotation, wherein the key plate is fixed at a position corresponding to an end face of the fixed casing from which the trunnion boss is projected.

In the driving unit, the bearing for rotatably supporting the rotating casing around the periphery of the fixed casing is generally positioned by the nut, to which a lock means is given. Known as this type of conventional driving unit is the one disclosed by Japanese Laid-open (Unexamined) Patent Publication No. Hei 6(1994)-249297, which is shown in FIG. 26. The driving unit 118 has a cylindrical fixed casing 119 in which a hydraulic motor 120 is disposed. A first sun gear 122 is mounted on a front end portion of an output shaft 121 of the hydraulic motor 120. A rotating casing 124 is rotatably supported around a periphery of the fixed casing 119 via a bearing 123, and an internal gear 125 is formed around an inside of the rotating casing 124. The rotation of the first sun gear 122 is transmitted to the internal gear 125 through a first planetary gear 126, a second sun gear 128 engaged with a planetary gear frame 127 of the first planetary gear 126, a third sun gear 130 engaged with the planetary gear flame 129 of the second planetary gear 128, and a third planetary gear 132 rotatably supported on a carrier 131 threadedly engaged with the fixed casing 119, to rotate the rotating casing 124 at a reduced speed. A flange 133 of the fixed casing 119 is bolted to the body (not shown), and a flange 134 of the rotating casing 124 is bolted to a crawler sprocket 135.

The rotating casing 124 is rotatably supported to the fixed casing 119 via the bearing 123, for which a conical roller bearing is used, and a preload is applied to the bearing 123 by screwing the nut 136 with an adequate torque. In order to keep the bearing 123 in the state in which the preload is applied thereto, the nut 136 must be locked against rotation. For this reason, the structure shown in FIGS. 27(a), 27(b) is adopted, wherein a key plate 137 having a key 137a to be fitted in a key slot 119a of the fixed casing 119 and the nut 136 are fixed by bolts 138. A number of threaded holes 136a are formed in the side of the nut 136 at regular intervals so that the bolts 138 can be screwed in the related threaded holes 136a by only a slight turning of the nut 136 which is in an adequate fastened state.

However, due to the structure that the key slot 119a is formed in the fixed casing 119 and, in addition to the nut 136, the key plate 137 and bolt heads 138 are interposed between the bearing 123 and the carrier 131, a distance d between the nut 136 and the end portion of the fixed casing 119 is disadvantageously elongated.

With the construction according to the 14th aspect of the invention, since the planetary gear of the final stage and the key plate are so disposed as to be partially overlapped, the driving unit can be reduced in axial dimension to the extent corresponding to the overlapped portion.

In accordance with a 15th aspect of the invention, there is provided a driving unit according to 14th aspect of the invention, wherein support pillars projected from the fixed casing and support pillars projected from the holder are fixed in abutment with each other, and the key plate is fixed to the end face of the fixed casing in the state of being partially engaged in a cutout portion of the support pillar on the fixed casing side.

According to this construction, since the key plate is disposed in place by means of the cutout portions provided in the support pillars between the holder for supporting the front end portion of the trunnion boss and the fixed casing, it can be prevented from interfering with the planetary gears.

In accordance with a 16th aspect of the invention, there is provided a driving unit according to 14th aspect of the invention, wherein the trunnion bosses are disposed along the periphery of the fixed casing.

This construction enables the fixed casing to be reduced in circumferential dimension by extending the fixed casing along a circumscribed circle of the trunnion bosses. This enables the driving unit to be reduced in radial dimension as well as in axial dimension.

In accordance with a 17th aspect of the invention, there is provided a driving unit comprising a fixed casing having a hydraulic motor therein; a rotating casing rotatably supported around a periphery of the fixed casing via a bearing inserted from one end portion of the fixed casing and having an internal gear around an inside thereof; a sun gear mounted on an output shaft projected from the hydraulic motor toward the one end portion of the fixed casing; a planetary gear train disposed between the sun gear and the internal gear to reduce speed in two or more stages; a trunnion boss, disposed at the one end portion of the fixed casing, for rotatably supporting the planetary gear train of a final stage engaging with the internal gear; a holder in which a front end portion of the trunnion boss is inserted and which is mounted on the fixed casing; and a nut threadedly engaged with the periphery of the fixed casing to position the bearing with respect to an axial direction of the fixed casing; and a pin, disposed between the nut and the holder, for locking the nut against rotation.

According to this construction, since the nut and the holder are connected by the pin without any use of the key plate, the nut can be locked against rotation without any elongation of the axial dimension of the fixed casing.

In accordance with a 18th aspect of the invention, there is provided a driving unit according to 17th aspect of the invention, wherein support pillars projected from the fixed casing and support pillars projected from the holder are fixed in abutment with each other, a projection projecting from the holder along a periphery of the support pillar, and the pin is disposed between the projection and the nut.

According to this construction, at the same time when the holder is inserted toward the fixed casing so that the end faces of the support pillars at the front ends thereof are put into abutment with each other, the nut is locked against rotation by means of the pin.

BRIEF DESCRIPTION OF THE DRAWINGS

FIG. 11(a) is a side view of the same and FIG. 11(b) is a vertically sectioned view of the same;

FIG. 12(a) is a front view of the input shaft portion; FIG. 12(b) is a sectional view of the input shaft portion; and FIG. 12(c) is a top view of one of the spline cogs;

FIG. 13(a) is a front view of the input shaft portion; FIG. 13(b) is a sectional view of the input shaft portion; and FIG. 13(c) is a top view of one of the spline cogs;

FIG. 15 illustrates a structure of the first sun gear of the second embodiment of the present invention, FIG. 15(a) is a side view of the same and FIG. 15(b) is a vertically sectioned view of the same; and 15(c) is a top view of one of the engaging cogs of the first sun gear;

DETAILED DESCRIPTION OF THE PREFERRED EMBODIMENTS

In the following, description will be given to the preferred embodiments of the present invention with reference to the accompanying drawings. FIGS. 1–13 are illustrations on the first embodiment of the present invention. FIGS. 14–24 are illustrations on the second embodiments of the present invention.

(An Example of First Embodiment)

Figure 1:
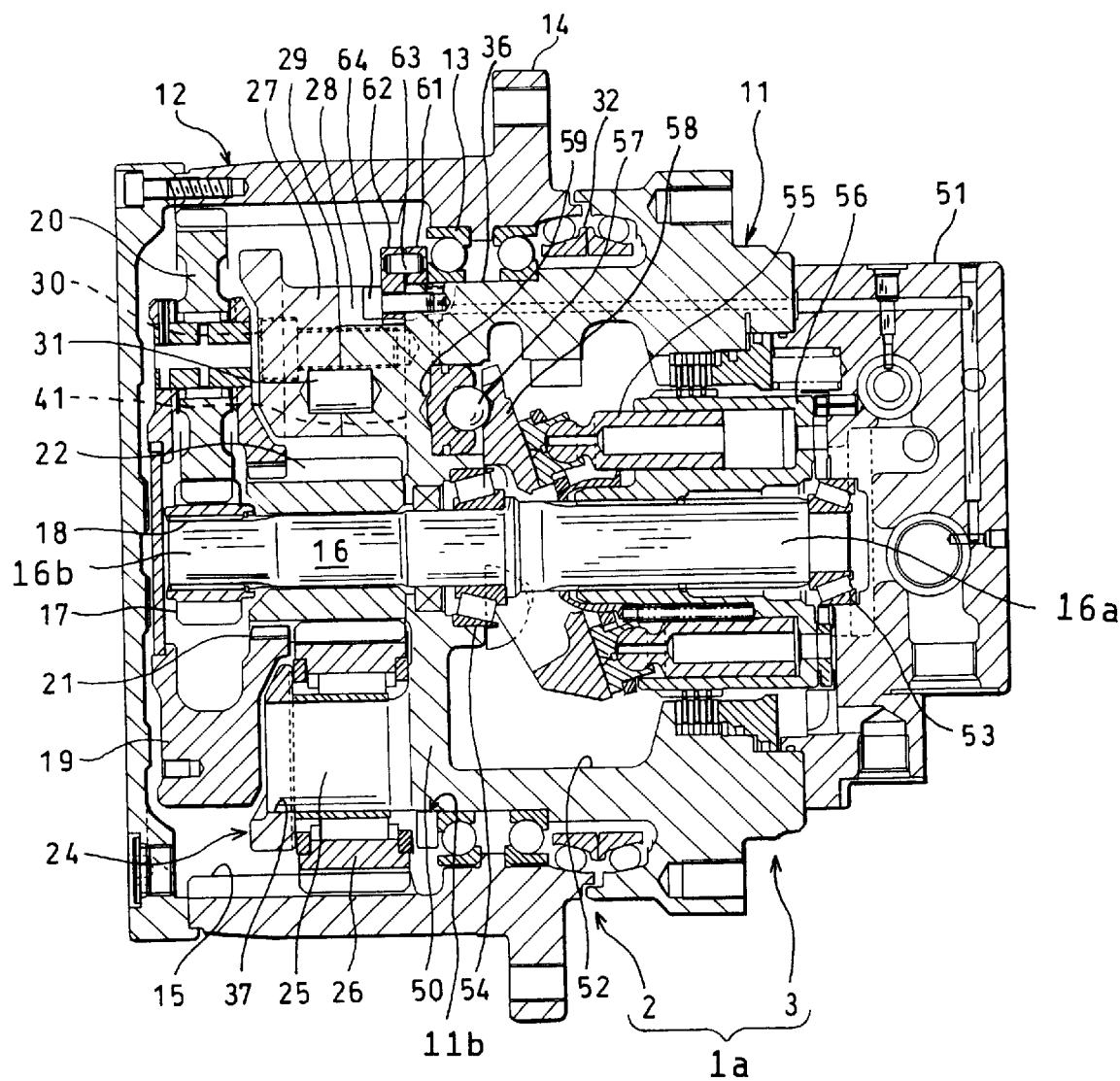
FIG. 1 is a sectional view of a driving unit of a first embodiment of the present invention.
Figure 2:
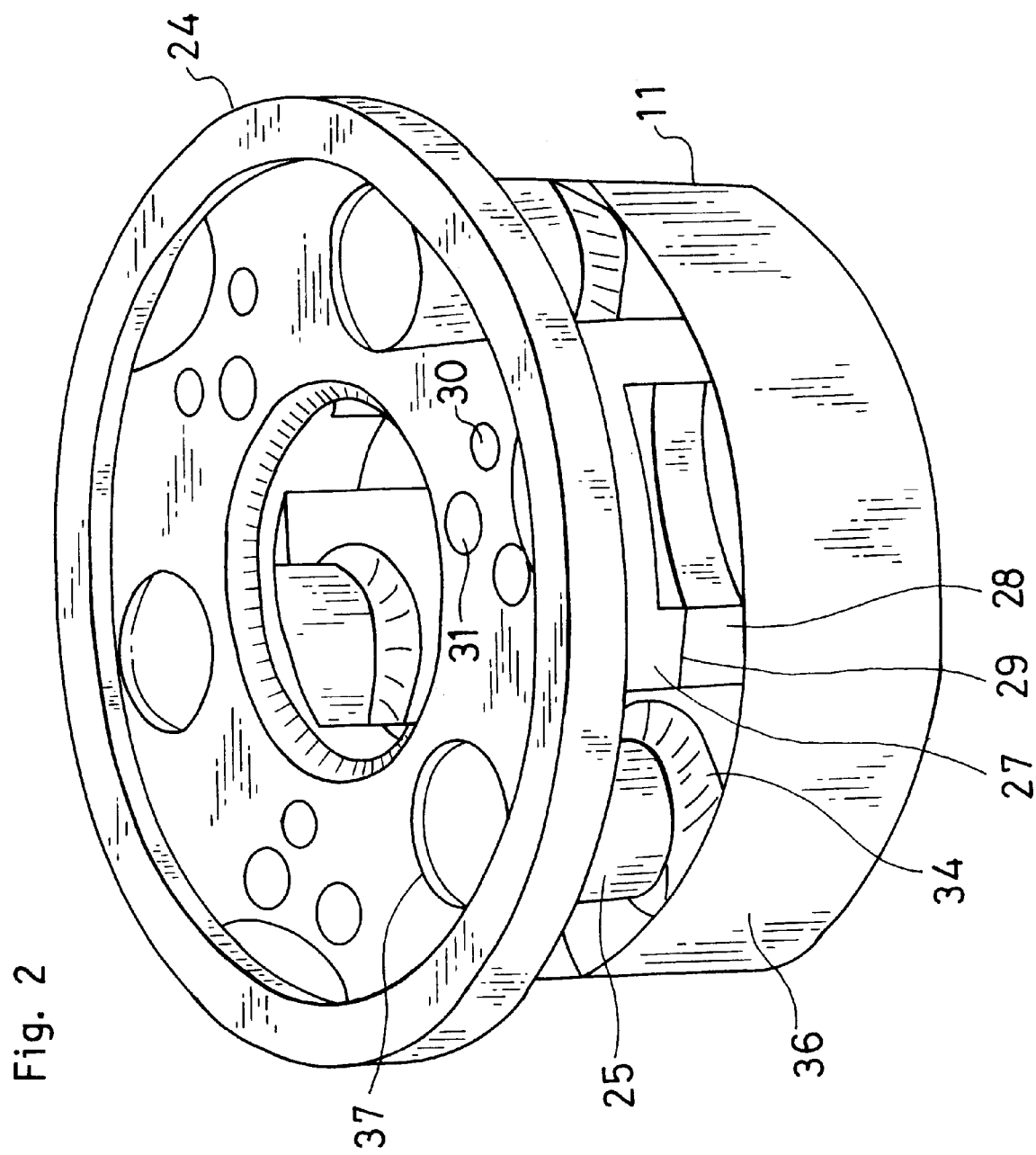
FIG. 2 is a schematic diagram of a holder supporting structure to an end face of a fixed casing of the first embodiment of the present invention.

First, an example of the first embodiment of the present invention will be described below. FIG. 1 is a sectional view of a driving unit 1a according to the first embodiment of the present invention. FIG. 2 is a perspective view schematically showing a holder 24 supporting structure to an end face of a fixed casing 11.

In FIG. 1, the driving unit 1a comprises a hydraulic motor 3 disposed in an interior of a fixed casing 11, a rotating casing 12 rotatably fitted to the fixed casing 11, and a reduction gear mechanism 2 of a two-stage planetary gear train housed in the rotating casing 12.

The rotating casing 12 is mounted on the outer of the fixed casing 11, so as to be freely rotatable and be axially immovable via bearings 13. The rotating casing 12 and the hydraulic motor 3 are combined with each other, with partially overlapping in the axial direction, at an approximately axial center of which a flange 14 for mounting a sprocket thereon, not shown, is provided. The bearing 13 and a floating seal 32 are fitted to the fixed casing 11 from one end portion thereof at the opposite side to the hydraulic motor 3. For avoidance of increase of outer diameters of the bearing 13 and floating seal 32, it is necessary to reduce an outer diameter of the fixed casing 11 on the reduction gear mechanism 2 side.

The reduction gear mechanism 2 having a two-stage planetary gear train for a large reduction gear ratio with a smallest possible number of gears is disposed in the interior of the rotating casing 12 at the one end portion of the fixed casing 11. An internal gear 15 is formed around the inner periphery of the rotating casing 12. A first sun gear 17 is fitted to an end of an output shaft 16 of the hydraulic motor 3, which serves as an input shaft of the reduction gear mechanism 2, via a spline 18. In other words, the hydraulic motor 3 and the first sun gear 17 are coupled with each other via the integrally molded rotating shaft. Three first planetary gears 20 which are rotatably supported on the planetary gear frame 19 are engaged between the first sun gear 17 and the internal gear 15. An outer periphery of a second sun gear 22 and an inner periphery of the planetary gear frame 19 which operates to transmit a orbital motion of the first planetary gear 20 around the first sun gear 17 are engaged with each other via a spline 21. The single first sun gear 17, the three first planetary gears 20, the internal gear 15 and the planetary gear frame 19, that functions as the output shaft as well, form a first stage of the planetary gear train.

Three trunnion bosses 25 are integrally projected from one end portion of the fixed casing 11, and three second planetary gears 26 engaging between a second sun gear 22 and the internal gear 15 are rotatably supported by the trunnion bosses 25. There is provided a holder 24 having holes 37 in which end portions of the trunnion bosses 25 are fitted. Support pillars 27 extending from the holder 24 and support pillars 28 extending from the fixed casing 11 side are put in abutment with each other at their abutment surfaces 29 and are fixed by bolts 30 and locating pins 31. The second sun gear 22, the three second planetary gears 26, and the internal gear 15 that functions as the output shaft, form a second stage of the planetary gear train.

With the reduction gear mechanism 2 thus structured, when the first sun gear 17 is rotated by the drive of the hydraulic motor 3, the first planetary gears 20 engaging with both of the first sun gear 17 and the internal gear 15 are rotated together with the planetary gear frame 19 at a reduced speed around the first sun gear 17. The rotation is transmitted to the second sun gear 22 and, further, through the second planetary gear 26, the rotating casing 12 having the internal gear 15 is rotated at a reduced speed, so that the sprocket (not shown) mounted on the flange 14 or the driving portion is rotationally driven.

Figure 3:
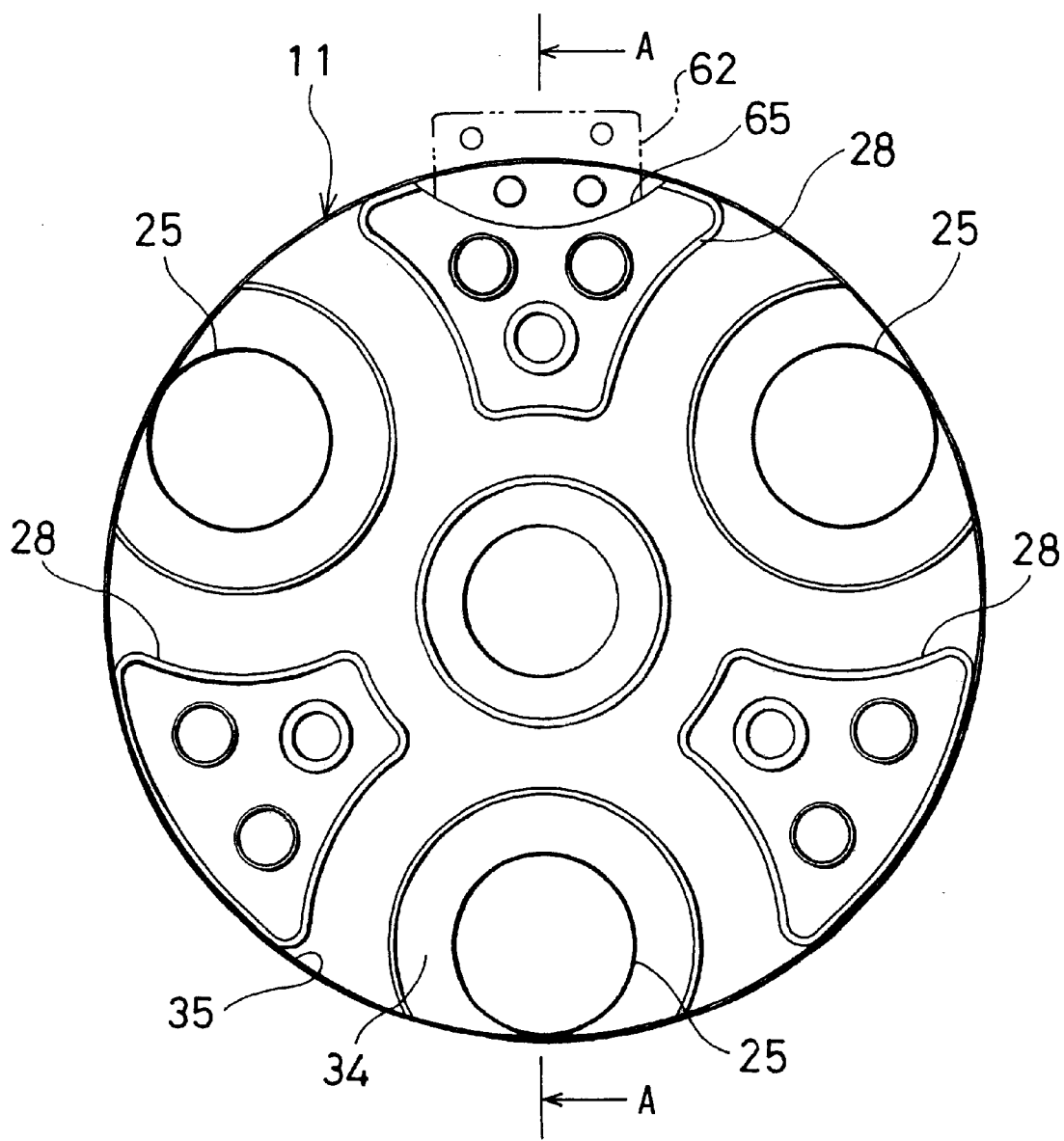
FIG. 3 is a front view of one end surface of the fixed casing of the first embodiment of the present invention.
Figure 4:
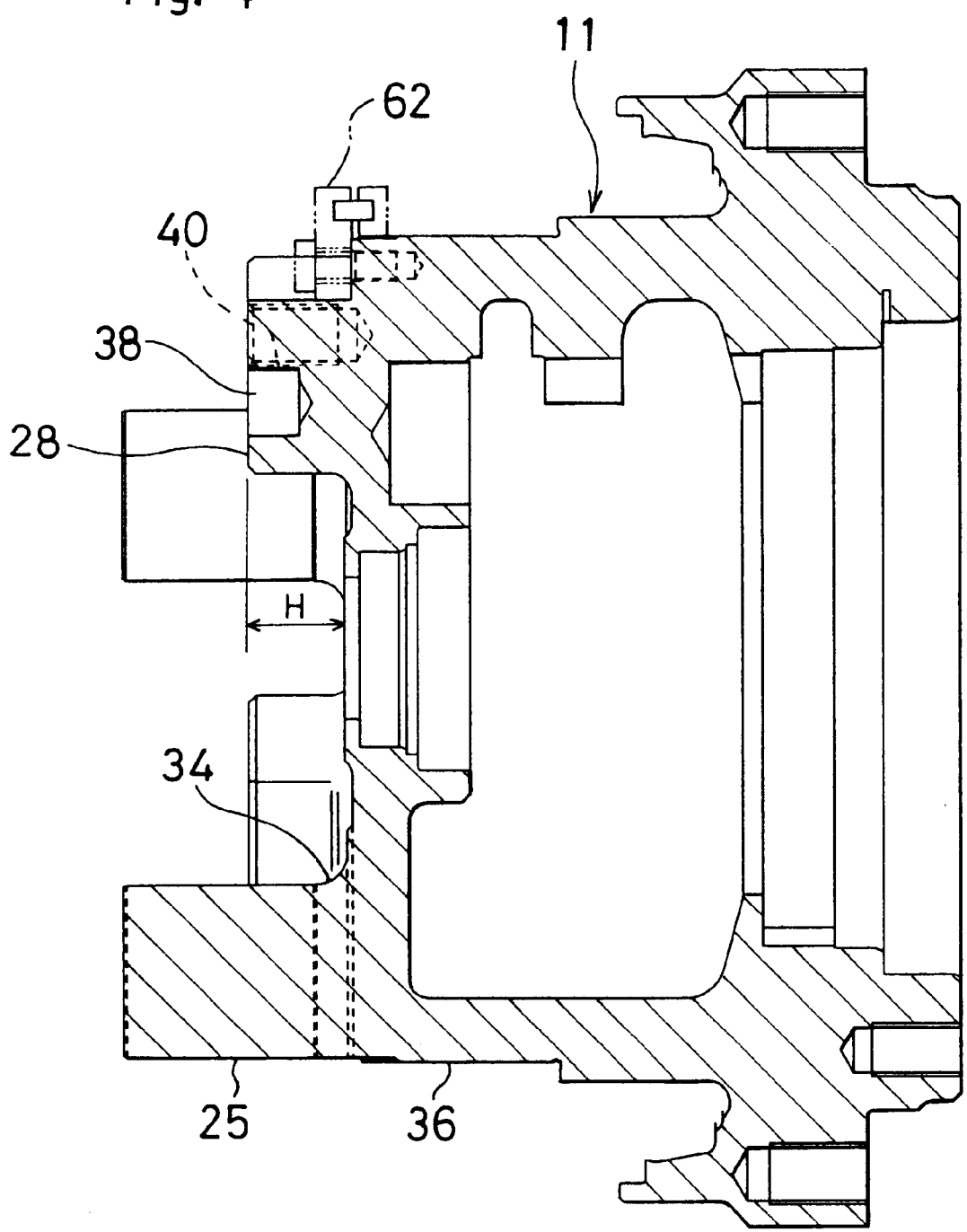
FIG. 4 is a sectional view taken along line A—A of FIG. 3.

Referring to FIGS. 2–6, the support structure of the second planetary gear 26 of the secondary planetary gear train of the final stage will be described. FIG. 3 is a front view of one end face of the fixed casing 11 and FIG. 4 is a sectional view taken along line A—A of FIG. 3. The three trunnion bosses 25 are projected at the one end portion of the fixed casing 11 at regular circumferential intervals of 120°. The trunnion bosses 25 are rounded to have rounded portions 34 at their basal ends. However, a diameter of a circumscribed circle 35 of the three trunnion bosses 25 is substantially the same as a diameter of the periphery 36 of the fixed casing 11 onto which the bearing 13 (FIG. 1) is fitted. Thus, the rounded portions 34 are not provided at portions thereof at which they interfere with the circumscribed circle 35.

Three support pillars 28, each having a generally triangular shape, are provided between the adjacent trunnion bosses 25 at the one end portion of the fixed casing 11 so as to integrally project therefrom. The support pillars 28 are positioned at a height H substantially the same as an approximately widthwise center of the second planetary gears 26 supported by the trunnion bosses 25 (See FIG. 1).

Figure 5:
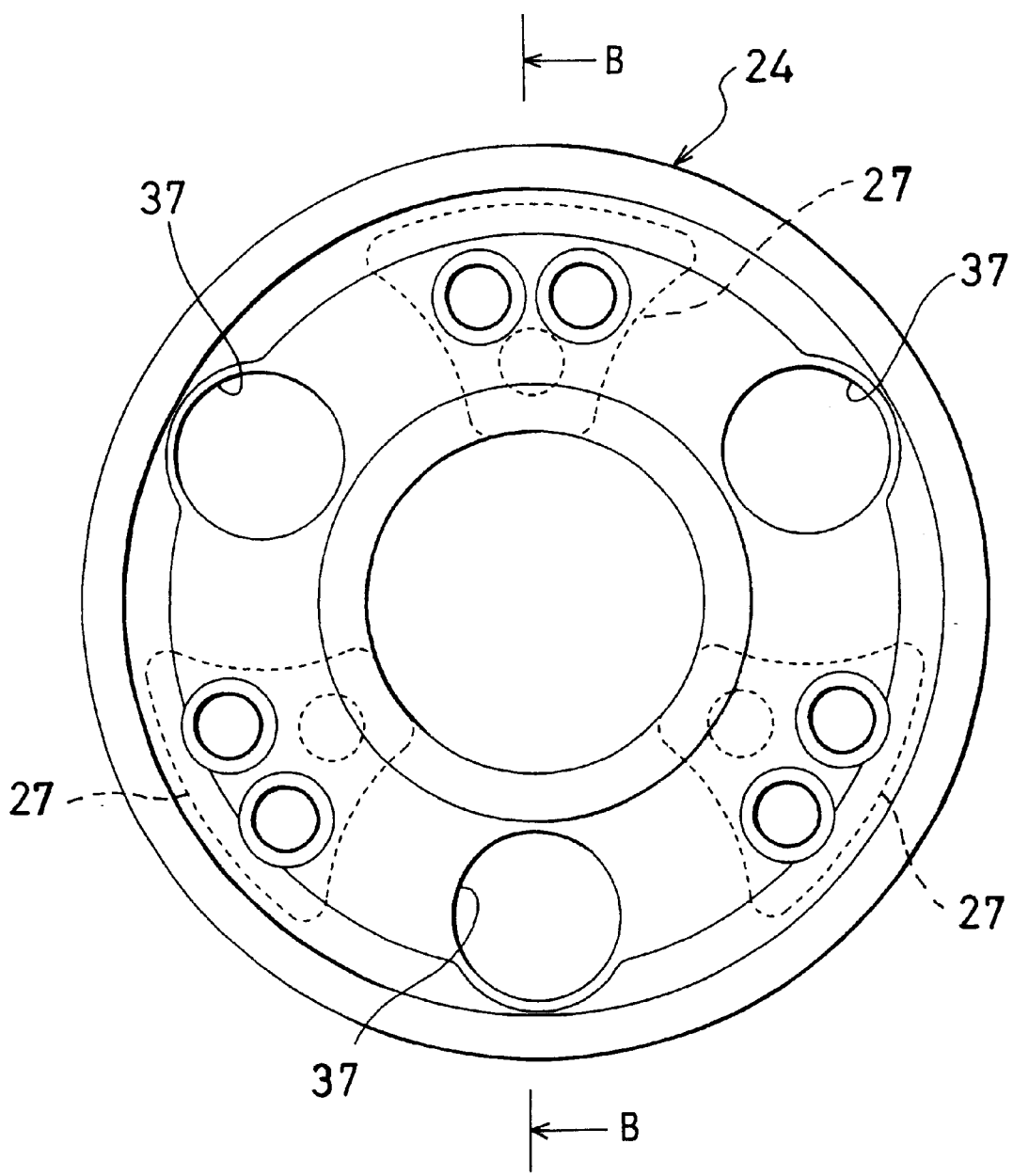
FIG. 5 is a front view of the holder of the first embodiment of the present invention.
Figure 6:
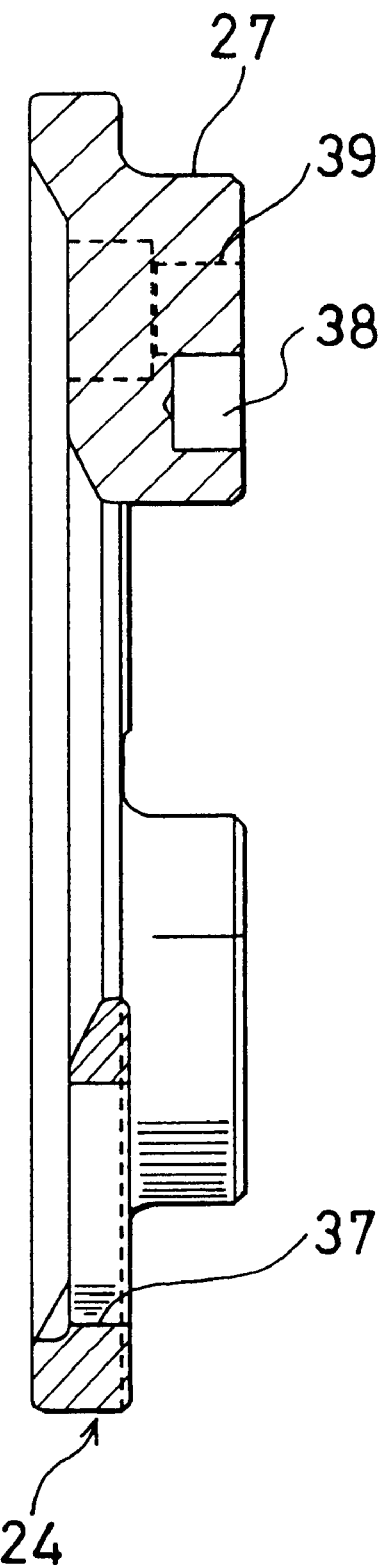
FIG. 6 is a sectional view taken along line B—B of FIG. 5.

FIG. 5 is a front view of the holder 24 and FIG. 6 is a sectional view taken along line B—B of FIG. 5. The holder 24 having a disk-like shape has three generally triangular support pillars 27 integrally projected toward the one end of the fixed casing 11. Three holes 37 in which the end portions of the trunnion bosses 25 (FIG. 4) are fitted are provided between the adjacent support pillars 27.

The second planetary gears 26 (FIG. 1) are fitted onto the trunnion bosses 25 of FIG. 4 so as to be freely rotate via needle bearings and the like. In this state, the pins 31 (FIG. 1) are fitted in holes 38 between the support pillars 27, 28 and, further, the bolts 30 (FIG. 1) are screwed in bolt holes 39 of the support pillars 27 and threaded holes 40 of the support pillars 28, so that the support pillars 27, 28 are fixed in abutment with each other at their abutment surfaces 29. The bolts 30 and the pins 31 form fastening means of the support pillars 27, 28.

Shown in FIG. 2 is the state of the holder 24 fixed at the one end portion of the fixed casing 11 by the fastening means. Portions of the trunnion bosses 25 extending along the circumscribed circle 35 (See FIG. 3) are substantially tangent to the periphery 36 of the fixed casing 11, and the trunnion bosses 25 are rounded at the basal ends to have the rounded portions 34 thereat. This projected structure of the trunnion bosses 25 can provide reduction in stress concentration to the basal ends, as well as in diameter of the periphery 36 of the portion of the fixed casing 11 onto which the bearing 13 (FIG. 1) is fitted. Also, the support pillars 28 integrally projected from the fixed casing 11 and the support pillars 27 integrally projected from the holder 24 are put in abutment with each other at their abutment surfaces 29 and are fixed together by the bolts 30 through the pins 31. Thus, the ends of the trunnion bosses 25 are fitted into the holes 37 of the holder 24 and, as a result of this, the trunnion bosses are brought into the state of being supported at both ends.

Figure 7:
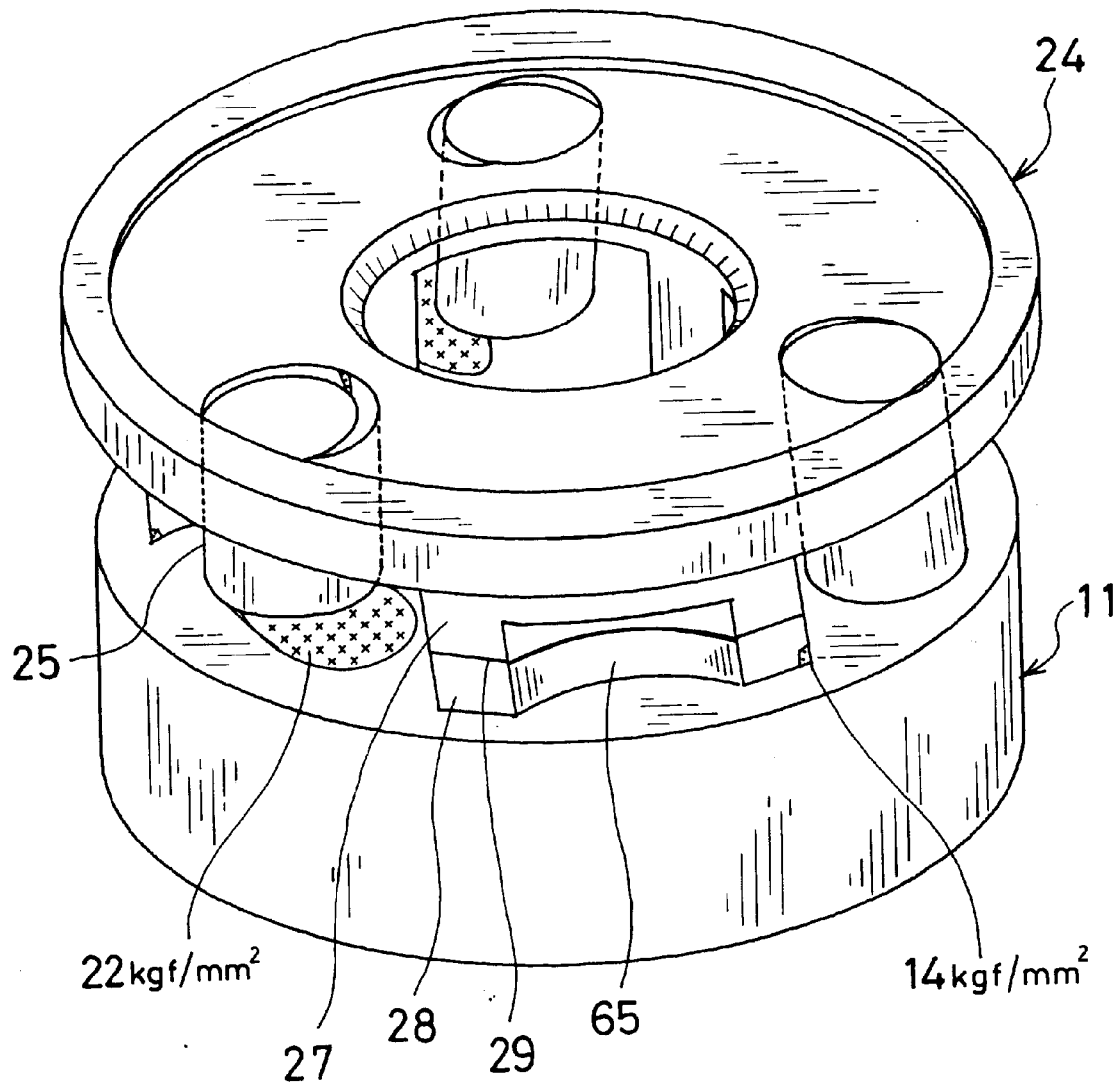
FIG. 7 is a diagram showing stress distribution of the holder supporting structure to the end face of the fixed casing of the first embodiment of the present invention.

Shown in FIG. 7 is a diagram showing stress distribution provided when a bending force acts on the one end portion of the fixed casing 11 of FIG. 2. When a clockwise bending stress acts on an approximately center portion of a trunnion boss 25, a maximum bending stress (22 kgf/mm$^2$) in the counterclockwise direction is generated at the basal end of the trunnion boss 25. In addition to this, a large stress (14 kgf/mm$^2$) is also generated in at a counterclockwise corner of the support pillar 28 at the fixed casing 11 side. It is found from these facts that the bending stress caused by the bending force acting on the trunnion boss 25 is dispersed and burdened by the support pillar 28 on the fixed casing 11 side through the support pillar 27 of the holder 24. It is also found that the bending stress is not substantially generated around the abutment surfaces 29 of the support pillars 27, 28, from which it is found that the abutment surfaces 29 should preferably be located within the limits of an effective length of each trunnion boss 25, or at an approximately center portion of the same, in particular.

This specific constitution of the support pillars 27, 28 as shown in FIG. 2 enables the bending stress on the basal end of the trunnion bosses 25 to be reduced and also enables the trunnion bosses 25 to be reduced in size. Also, since the circumscribed circle 35 of the trunnion bosses 25 and the periphery 36 of the fixed casing 11 are made substantially equal to each other, the bearing 13 and the floating seal 32 (FIG. 1) which are inserted from the one end portion of the fixed casing 11 can be reduced in outer diameter, and as such can allow the rotating casing 12 to reduce in outer diameter and in turn can allow the radial dimension of the driving unit 1a to be minimized.

In FIG. 1, a tapered roller bearing is used as the bearing 13 to rotatably support the rotating casing 12 to the fixed casing 11. The bearing 13 is held in place, with an adequate tightening force kept constant, by a nut 61 screwably engaged with a threaded portion 11b of the fixed casing 11 formed from an end face 41 toward the bearing 13.

Figure 8:
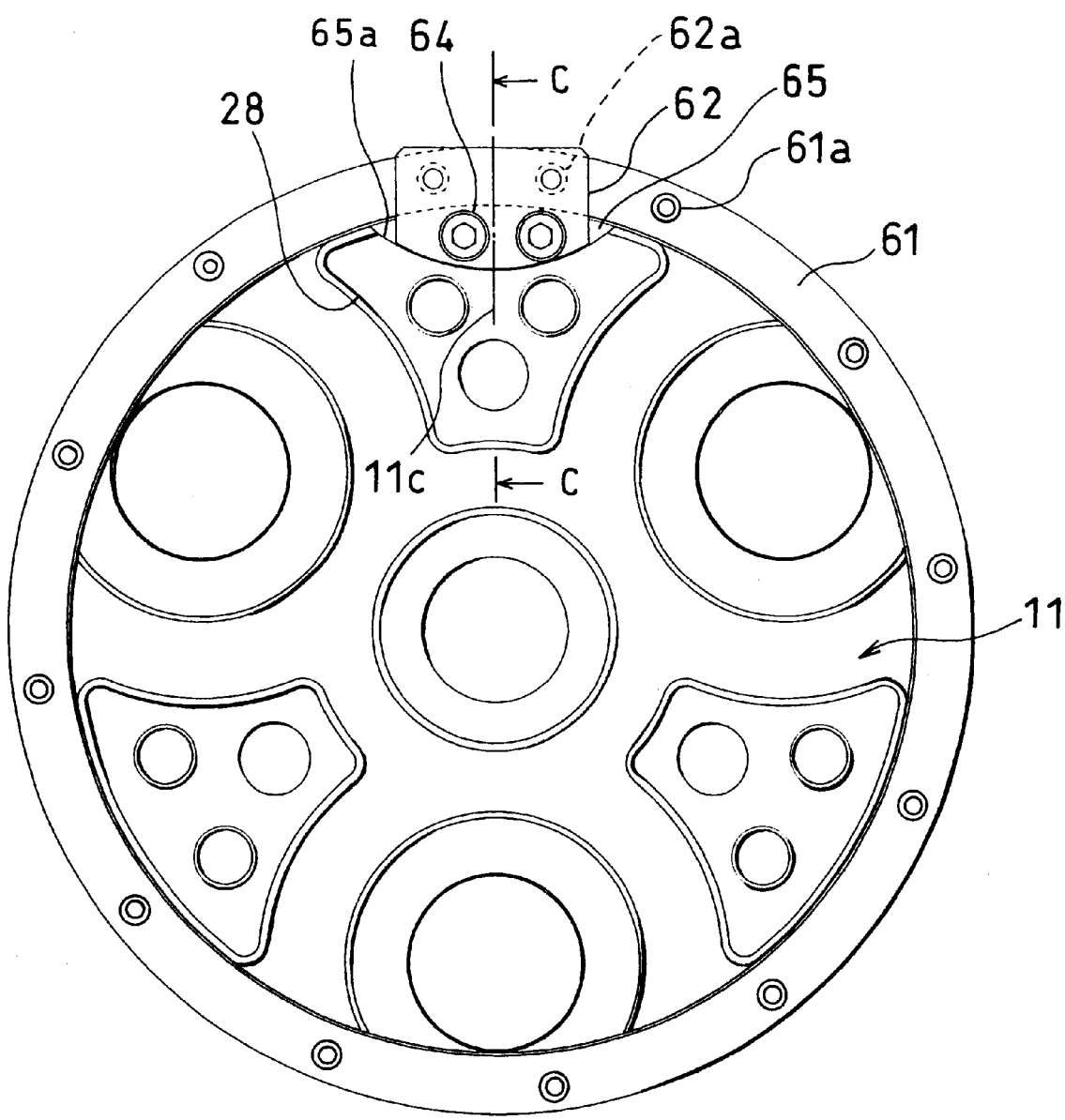
FIG. 8 is a front view of the fixed casing to which a nut is screwed in and a key plate is mounted in the first embodiment of the present invention.
Figure 9:
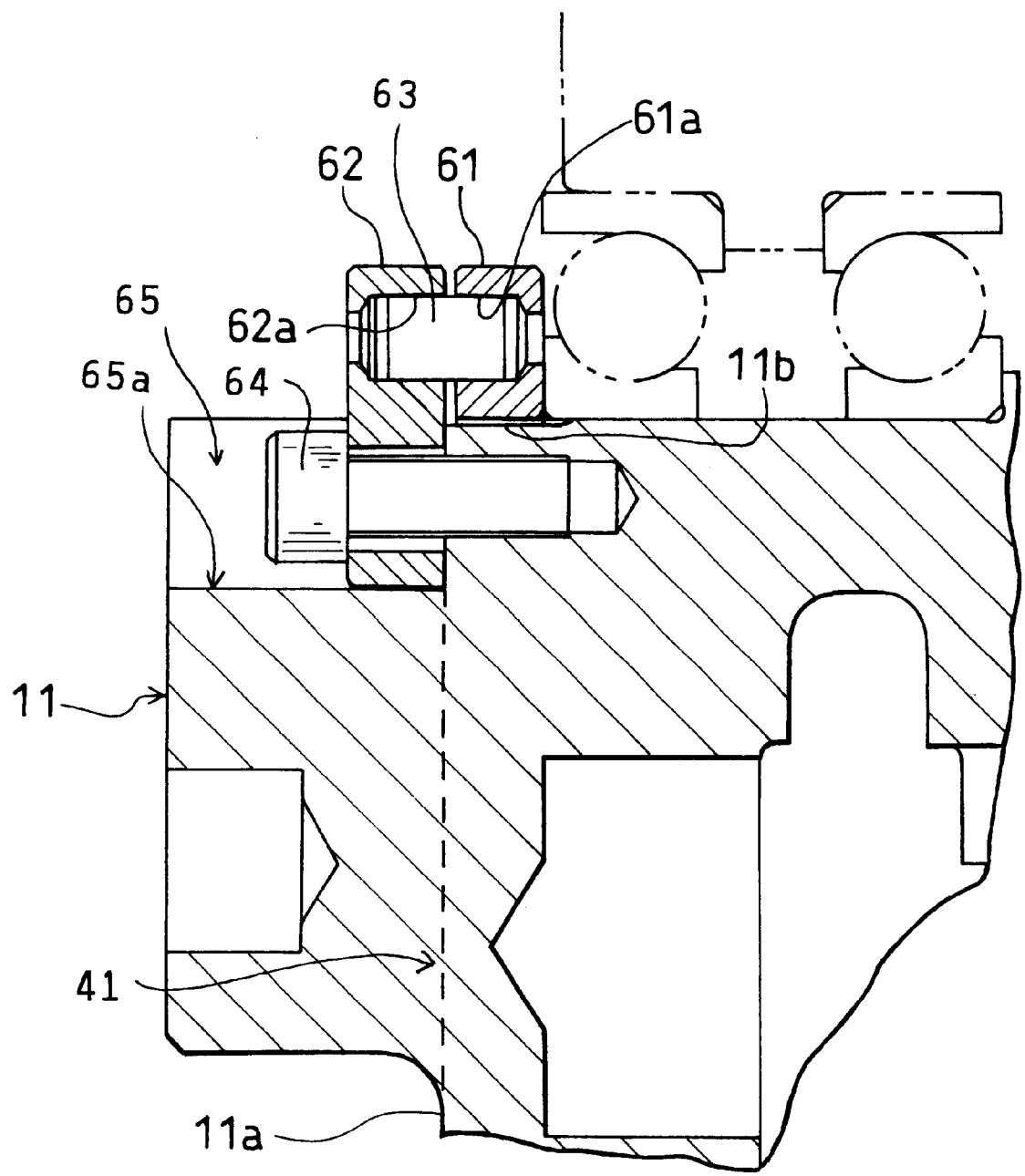
FIG. 9 is a sectional view taken along line C—C of FIG. 8.

Referring to FIGS. 8 and 9, a lock mechanism of the nut 61 will be described. FIG. 8 is a front view of the fixed casing 11 to which the nut 61 is screwed and a key plate 62 is mounted. FIG. 9 is a sectional view taken along line C—C of FIG. 8.

As shown in FIG. 8, a number of pin holes 61a are formed on the side of the nut 61 at regular intervals. As shown in FIGS. 8 and 9, the fixed casing 11 is cut out in arc at the periphery of the support pillar 28 to form a cutout portion 65 extending laterally from the end face 41. The key plate 62 is fixed to a side surface 65a of the cutout portion 65 by two bolts 64, with its side surface being in abutment with the side surface 65a. The two bolts 64 are disposed at different lateral distances from a center line 11c therebetween. Also, the key plate 62 has two pin holes 62a corresponding in position to the pin holes 61a of the nut 61 which are formed symmetrically at equal distances from the center line 11c. By screwing the nut 61 slightly, either of the two pin holes 62a can be aligned with any one of the pin holes 61a of the nut 61.

As shown in FIG. 9, a pin 63 is fitted in the aligned pin holes 61a, 62a, so that the nut 61 is locked against rotation by the key plate 62.

Although the circular-curved cutout portion 65 is provided at the approximately circumferential center of the one support pillar 28 on the fixed casing 11 side, since a little stress is distributed over the entire support pillar 28, except the ends of the support pillar 28 at the circumferential side thereof, as shown in FIG. 7, the provision of the cutout 65 does not impair the stress relief function of the support pillar 28. In addition, since the key plate 62 is disposed outside of the side surface 41 at one end portion of the fixed casing 11, the fixed casing 11 is prevented from being elongated axially by the key plate 62.

In FIG. 1, the fixed casing 11 has an inner cavity 52 which has a bottom 50 at one end portion thereof at the inside and is closed by a lid 51 at the other end portion thereof. The rotating shaft 16 is disposed along an axis of the inner cavity 52. The rotating shaft 16 is journaled for free rotation by a bearing 53 fitted in the lid 51 at one end of the shaft 16 and by a bearing 54 fitted in the bottom 50 at a mid portion of the other end side of the shaft 16. A cylinder block 56 in which a plurality of pistons 55 are slidably inserted is splined to the output shaft 16 for non-rotatable and sidable movement. A swash plate 58 swingably supported by means of a steel ball 57 is mounted on the bottom 50 side, and a cylinder 59 for slanting the swash plate 58 is disposed at one end of the swash plate 58. Front ends of the pistons 55 are in abutment with the swash plate 58 for freely sliding movement. Compressed oil is fed to and discharged from the cylinder block 56 via a counterbalance valve (not shown) provided in the lid 51.

Figure 10:
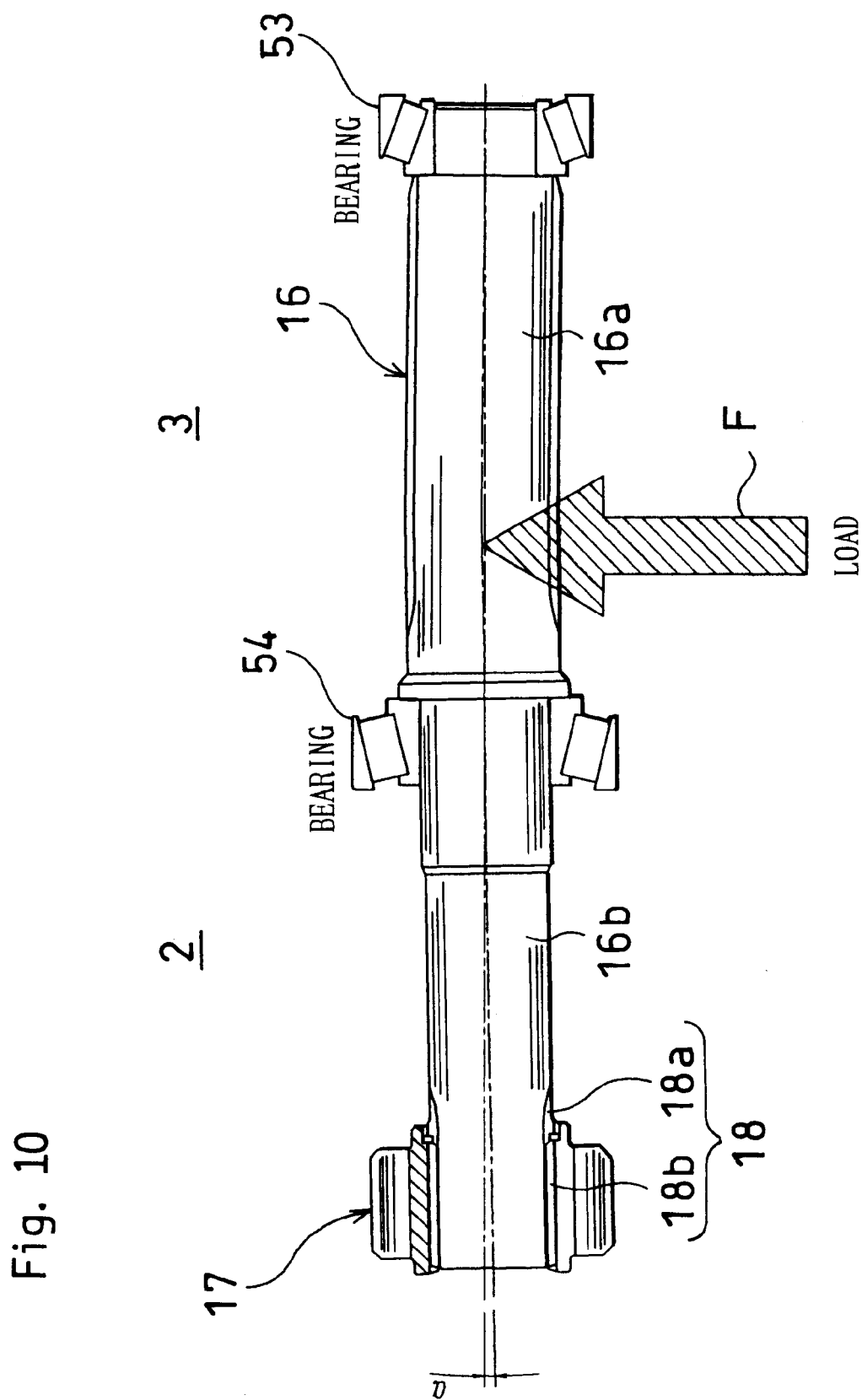
FIG. 10 is a side view showing a supporting structure of a rotating haft of the first embodiment of the present invention.

As clearly shown in FIG. 10, the rotating shaft 16 journaled by the two bearings 53, 54 located on the hydraulic motor 3 side is cantilevered beyond a center of the reduction gear mechanism 2, passing through it. The rotating shaft 16 is formed by an output shaft portion 16a on the hydraulic motor 3 side and an input shaft portion 16b on the reduction gear mechanism 2 side being formed into one piece. The first sun gear 17 is fitted to the end of the input shaft portion 16b by means of the spline 18. The spline 18 comprises spline cogs 18a on the outer periphery side of the input shaft 16b and spline grooves 18b on the inner periphery side of the first sun gear 17.

Figure 11:
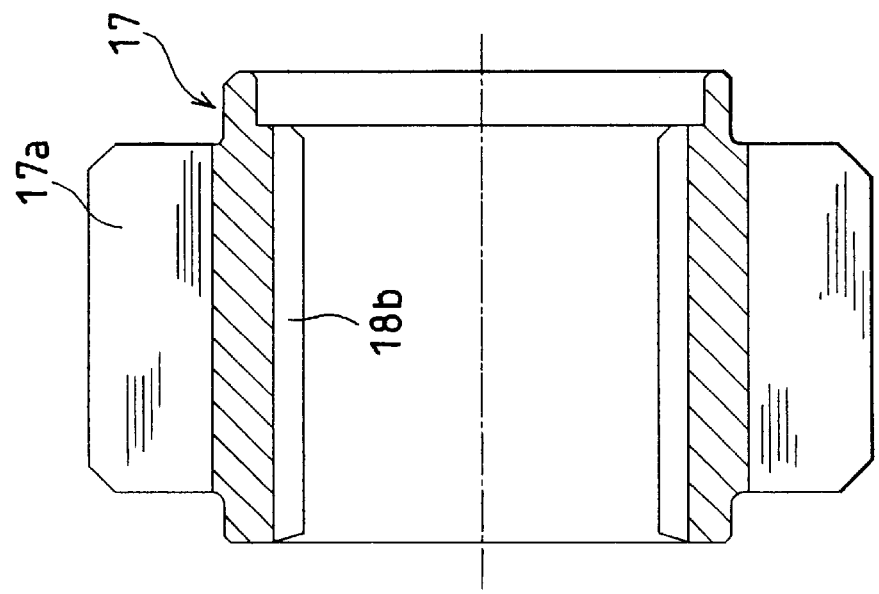
FIG. 11 illustrates a structure of a first sun gear of the first embodiment of the present invention.
Figure 11:
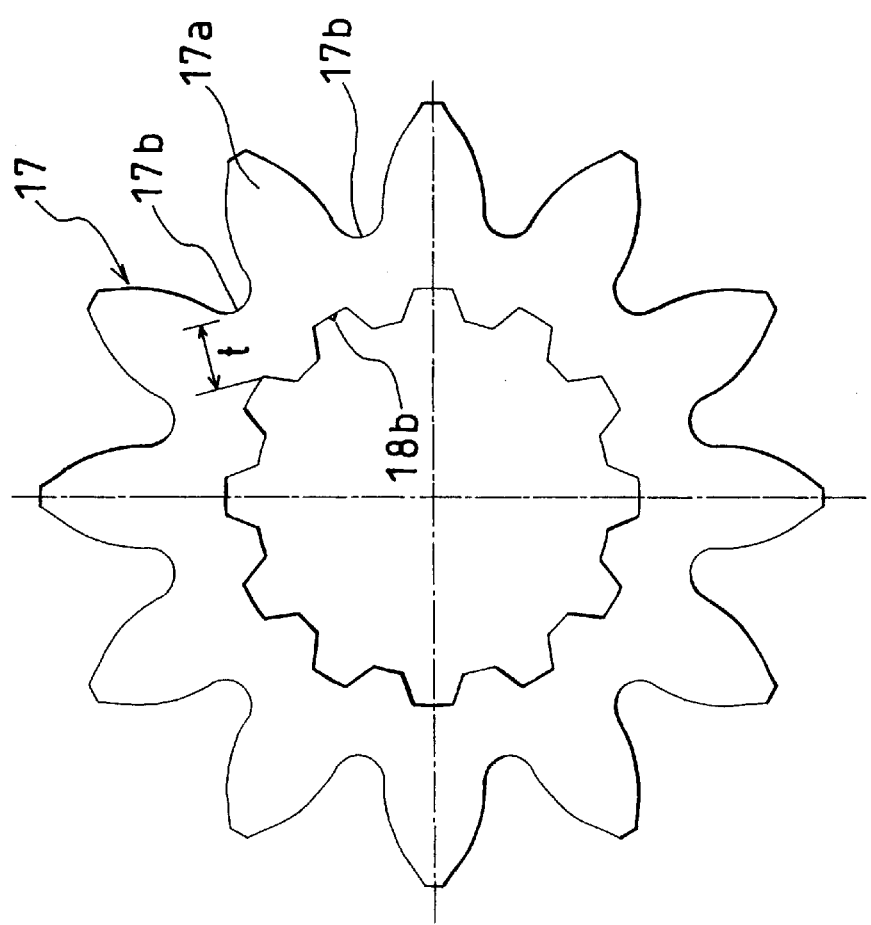

Shown in FIG. 11 is the structure of the first sun gear 17. FIG. 11(a) is a side view of the first sun gear and FIG. 11(b)

is a vertically sectioned view of the same. In FIG. 11(b), the first sun gear 17 has engaging cogs 17a engageable with the first planetary gear 20, not shown, formed around the periphery of the first sun gear 17, and the spline grooves 18b engageable with the spline cogs 18a of the input shaft 16b, not shown, formed around the inside of the first sun gear 17. In FIG. 11(a), the engaging cogs 17a formed around the periphery of the first sun gear 17 are equal in number to the spline grooves 18b formed around the inside thereof. The spline cogs 18a are arranged so that the spline grooves 18b can be positioned between spaces 17b between the engaging cogs 17a. This arrangement can prevent the spaces 17b between the engaging cogs 17a and the spline cogs 18a from being overlapped with each other to ensure the wall thickness t of the first sun gear 17, and as such can allow the first sun gear 17 to have a reduced outer diameter.

Figure 12:
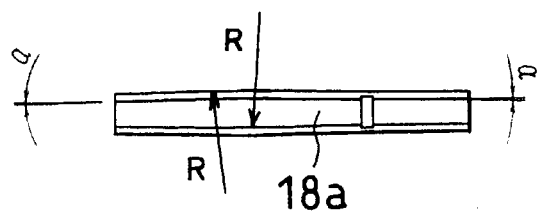
FIG. 12 illustrates a configuration example of spline cogs at an end portion of an input shaft portion of the rotating shaft of the first embodiment of the present invention.
Figure 12:
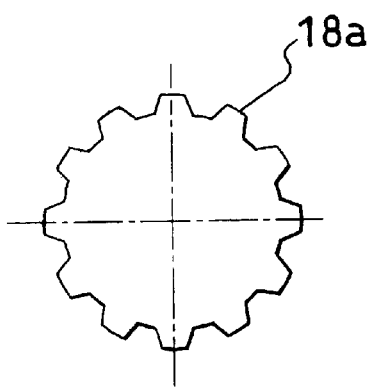
Figure 12:
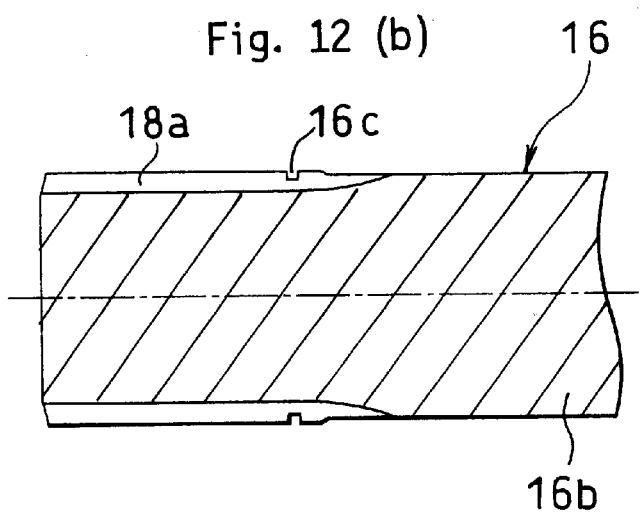

Shown in FIG. 12 is the structure of the spline cogs 18a at the end of the input shaft portion 16b of the rotating shaft 16. FIG. 12(a) is a front view of the input shaft 16b; FIG. 12(b) is a sectional view of the input shaft portion 16b; and FIG. 12(c) is a top view of a single spline cog. The spline cogs 18a extend in an axial direction of the input shaft portion 16b, as shown in FIGS. 12(a) and 12(b). A groove 16c is used for fitting therein a lock ring for locking the first sun gear 17 to the input shaft portion 16b. Opposite slanted surfaces of each spline cog 18a have a curved surface extending along an arcuate line of a radium R, such that the each spline cog 18a has a crown shape, protruding at an axial center thereof and gradually narrowing toward the opposite ends. The angle of inclination at the both ends of the spline cog 18a is α.

Turning to FIG. 10, a reaction force to a force of the piston 55 to press the swash plate 58 acts on the rotating shaft 16, and the load F is applied thereto. The input shaft portion 16b is rotated, with its front end inclined at an angle of α by the load F. The angle of inclination α at the front end of the rotating shaft 16 and the angle of inclinations α at the opposite ends of the spline cog 18a are generally identical with each other. As shown in FIG. 12, the spline cog 18a at the front end of the rotating shaft 16 has a widthwise crowned portion, so that even when inclination is caused at the end of the rotating shaft 16, the spline cog 18a is brought into abutment with the spline groove 18b (FIG. 11) at an approximately lengthwise center thereof.

Figure 13:
FIG. 13 illustrates another configuration example of the spline cogs at the end of the input shaft portion of the rotating shaft of the first embodiment of the present invention.
Figure 13:
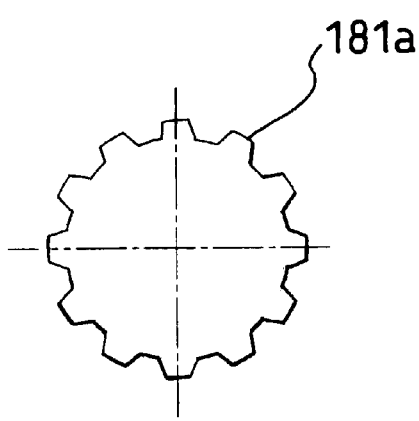
Figure 13:
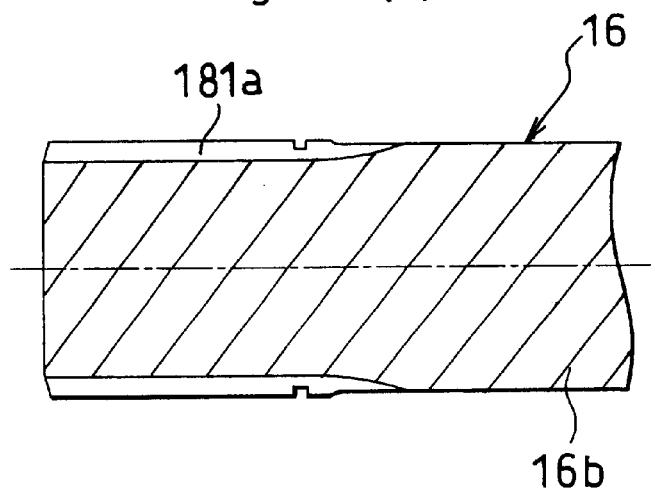

Shown in FIG. 13 is the structure of another spline cog 181a at the front end of the input shaft portion 16b of the rotating shaft 16. FIG. 13(a) is a front view of the input shaft portion 16b, FIG. 13(b) is a sectional view of the input shaft portion 16b, and FIG. 13(c) is a top view of a single spline cog. As shown in FIG. 13(c), the spline cog 181a has a tapered shape to be gradually narrowed toward the front end. The degree to which the spline cog is narrowed corresponds to the degree to which the angle of inclination of the side surfaces becomes α. Other respects are the same as those of FIG. 12.

As shown in FIGS. 12 and 13, the spline cog is preferably crowned or inclined to be gradually narrowed toward the end thereof, in terms of machinability and function. Alternatively, the spline groove 18b on the first sun gear 17 side may be crowned so that an axial center of the spline groove 18b is gradually narrowed in width or may be inclined so that the spline groove 18b is gradually widened toward the axial front end thereof. Further, both of the spline cog 18a and the spline groove 18b may be provided with a crowned portion or an inclined portion corresponding to clearance.

Figure 25:
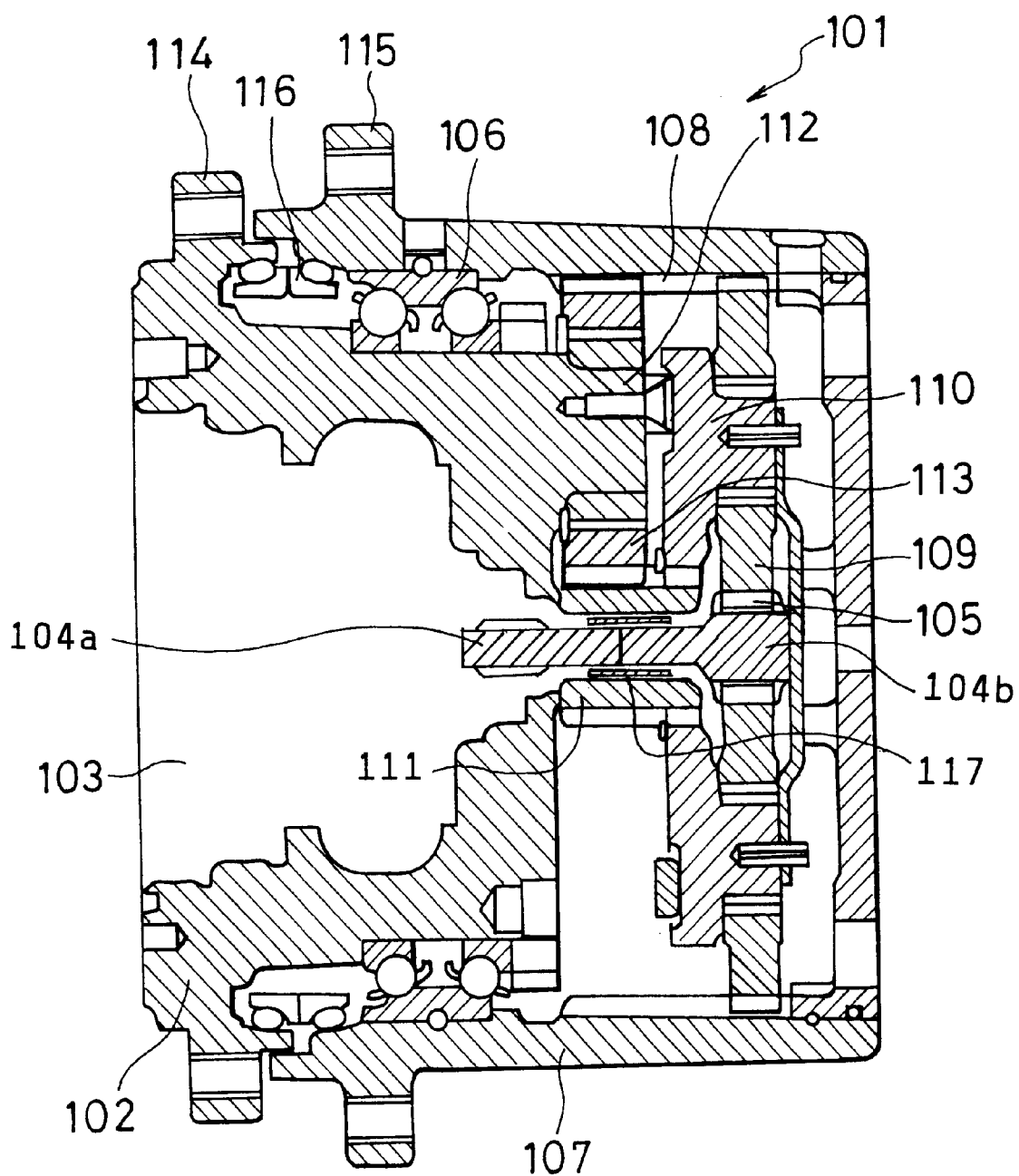
FIG. 25 is a sectional view of an example of a conventional driving unit.
Figure 26:
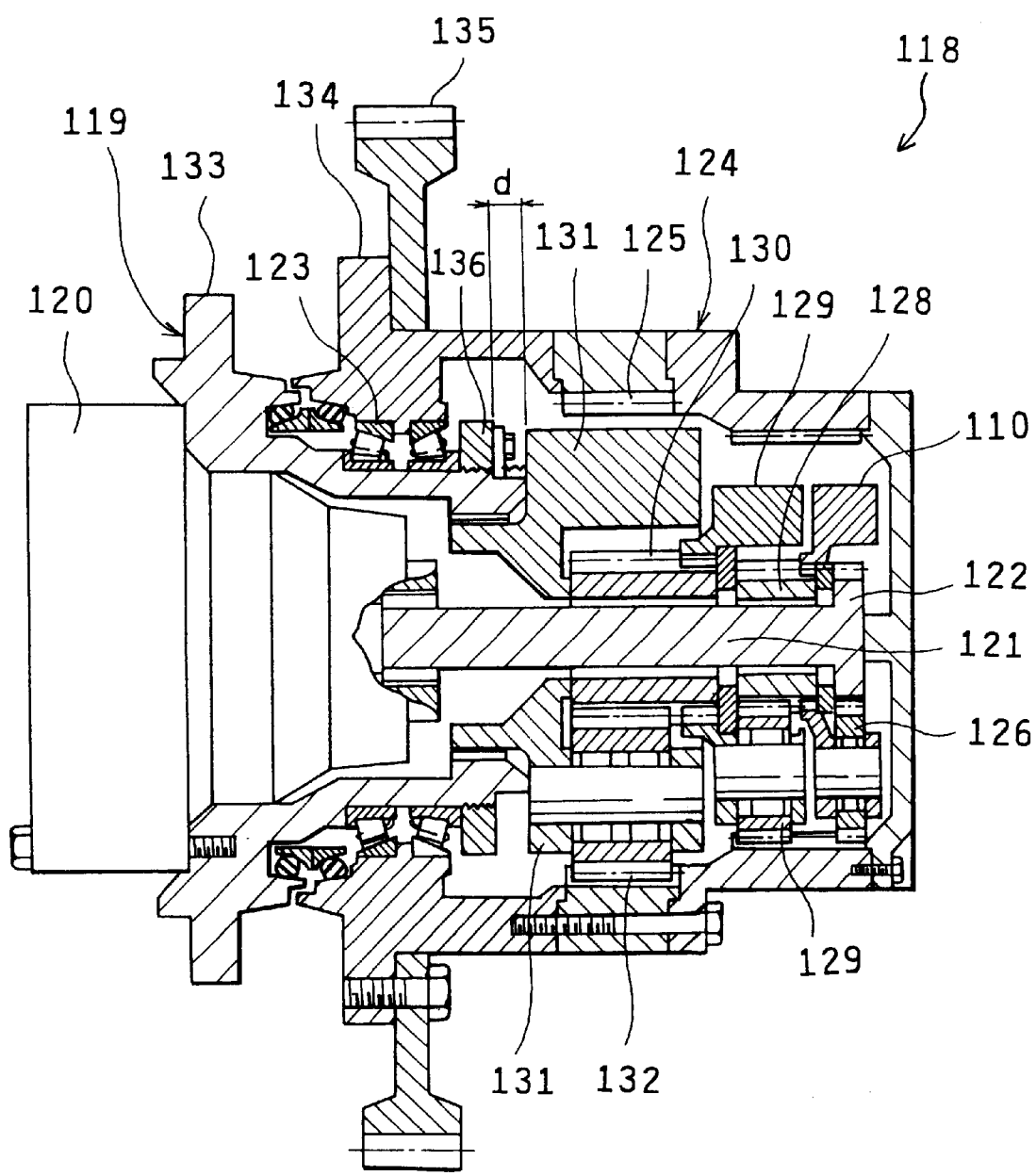
FIG. 26 is a sectional view of another example of a conventional driving unit.
Figure 27:
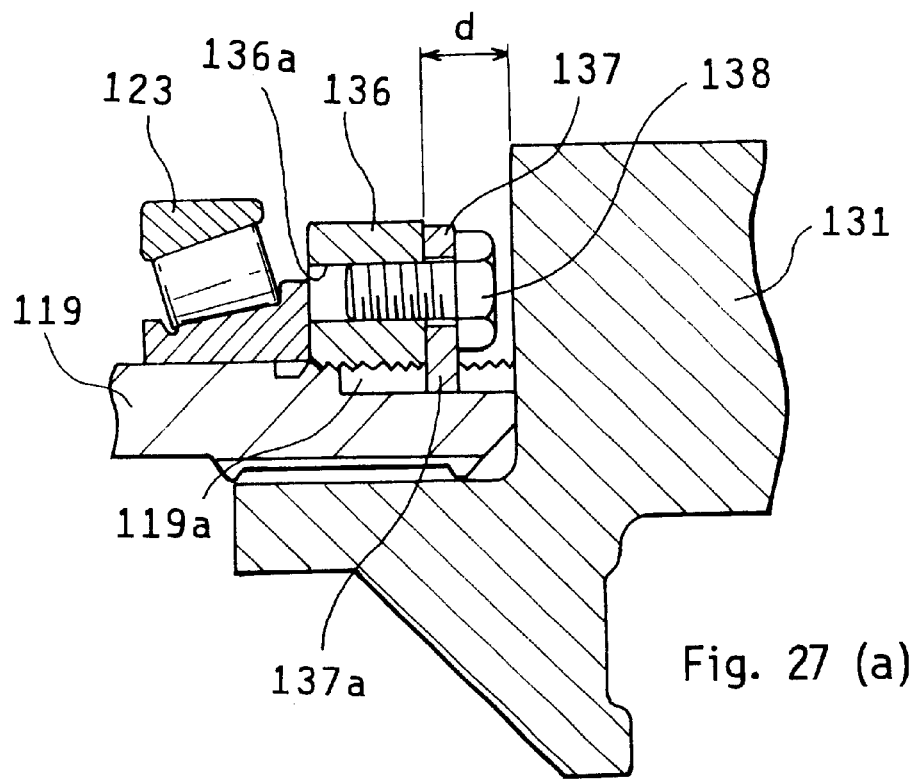
FIG. 27(a) is an enlarged sectional view of a principal part showing a structure of a lock nut of FIG. 26 taken along line I—I of FIG. 27(b)
FIG. 27(b) is an enlarged view of a side surface of a key plate of FIG. 26.
Figure 27:
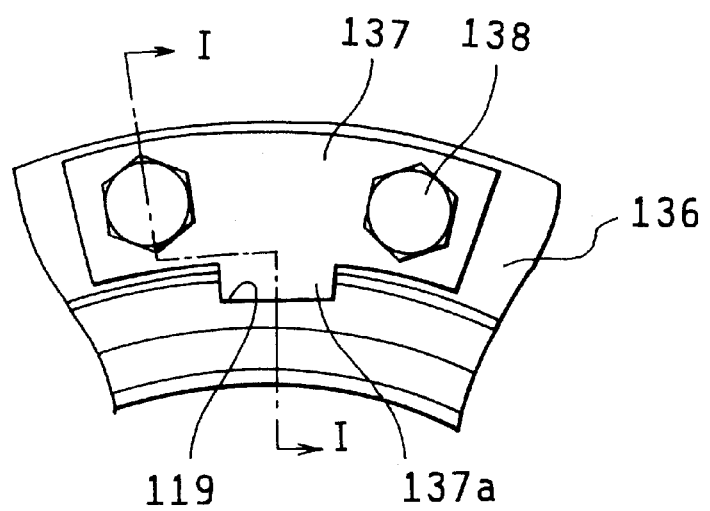

As mentioned above, the front end portion of the rotating shaft 16 is inclined by the application of the reaction force of the hydraulic motor 3. To allow for this inclination, either or both of the spline cog and the spline groove of the spline 18 are provided with the crowned portion or inclined portion so that the clearance therebetween can be gradually widened toward the front end of the spline 18. This clearance can prevent generation of collision between the spline cog and the spline groove even when the front end portion of the rotating shaft 16 is bent. Thus, in contrast to the prior art shown in FIG. 25 which is so constituted that the inclination of the rotating shaft is absorbed by a coupling 117 for connecting between an output shaft 104a of the motor and an input shaft 104b of the reduction gear, the embodiment of the present invention is so constituted that the inclination can be absorbed by the first sun gear 17. Hence, the subsequent gears are prevented from being adversely affected by the inclination of the rotating shaft 16.

Also, as shown in FIG. 1, the output shaft portion 16a and the input shaft portion 16b of the rotating shaft 16 are formed in one piece without any coupling provided therebetween, so that the rotating shaft 16 involves no large diameter portion at any location throughout the rotating shaft 16. This enables the second sun gear 22 disposed around the input shaft portion 16b of the rotating shaft 16 to be reduced in diameter, thus enabling the number of teeth of the second sun gear 22 to be reduced. As a result of this, if the reduction gear ratio is kept unchanged, the number of teeth of the internal gear 15 can also be reduced, and as such can reduce the diameter or size of the rotating casing 12. In addition, the distance between a center of the second sun gear 22 and a center of the second planetary gear 26 is shortened and, as a result of this, outward protrusion of the second sun gear 26 can be reduced. Therefore, the radial dimension or size of the driving unit la can be minimized.

Further, as shown in FIG. 11, the spaces 17b between the engaging cogs 17a and the spline cogs 18a are prevented from being overlapped with each other so that the first sun gear 17 can be allowed to have a reduced outer diameter. This enables the number of teeth of the first sun gear 17 to be reduced. As a result of this, if the reduction gear ratio is kept unchanged, the number of teeth of the internal gear 15 can also be reduced, and as such can reduce the diameter or size of the rotating casing 12. Consequently, outward protrusion of the first planetary gear 20 can be reduced. Therefore, the first planetary gear train and the second planetary gear train can both be reduced in size.

The example of the first embodiment of the invention as described above may be modified as follows, for practical use of the invention.

(1) While the reduction gear mechanism 2 having the two-stage planetary gear train was illustrated, the supporting structure of the embodiment of the present invention can be applied to a three-stage planetary gear train as well by the application to the final stage planetary gear train.

(2) The planetary gears revolving around the sun gear of the planetary gear train is not limited in number to three. For example, for four planetary gears, the supporting structure of the embodiment of the present invention can be applied thereto by increasing the trunnion bosses and the support pillars in number to four.

(3) In FIGS. 12 and 13, the spline 18 is not limited to the straight spline extending in parallel to the axis of the rotating shaft. The spline formed to extend obliquely with respect to the axial direction may be used.

(An Example of Second Embodiment)

Figure 14:
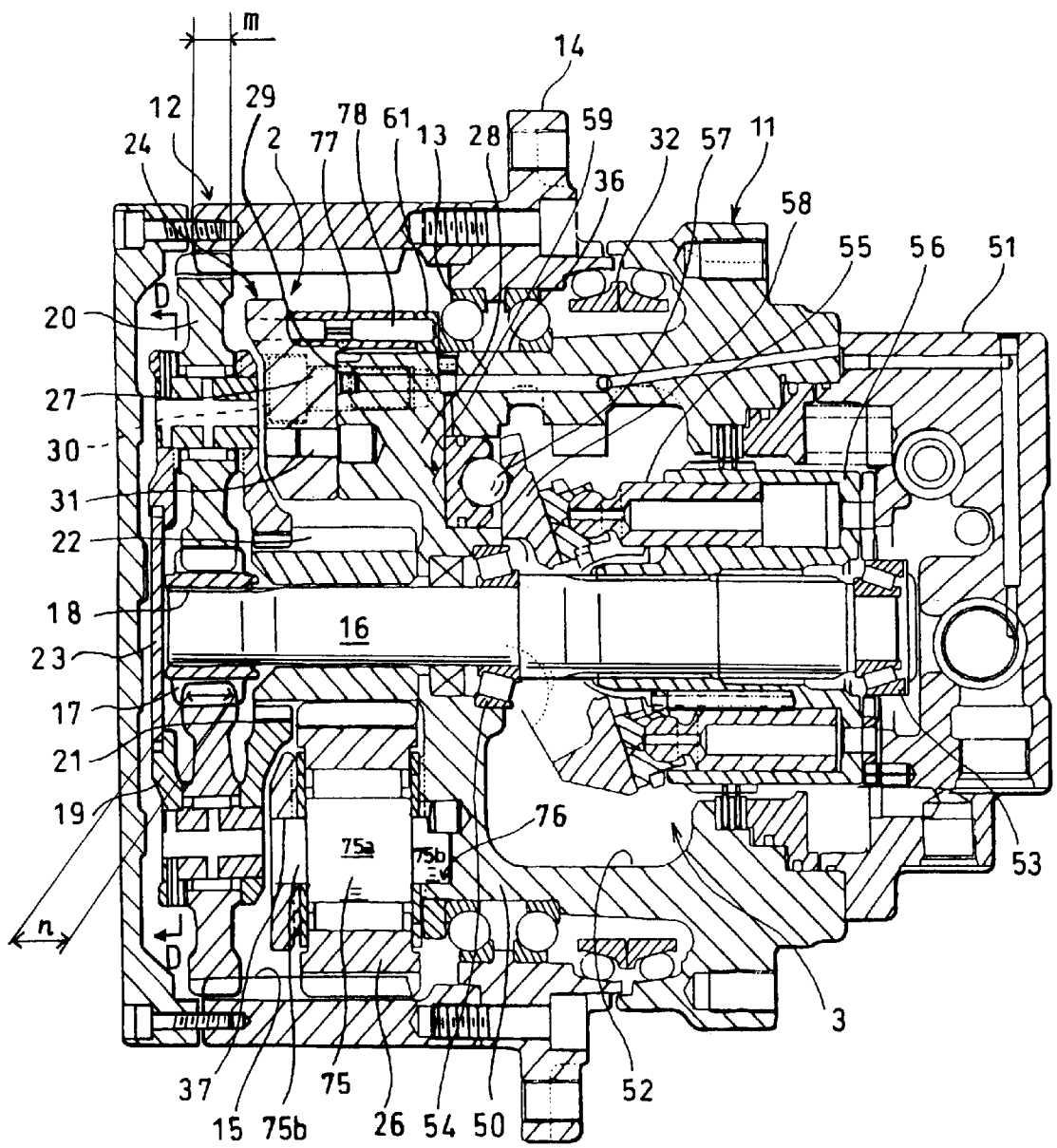
FIG. 14 is a sectional view of a driving unit of a second embodiment of the present invention.

Then, an example of the second embodiment of the present invention will be described below. To avoid repetition of description of corresponding construction to that of the example of the first embodiment, like numerals are labeled to corresponding parts throughout the drawings. FIG. 14 is a sectional view of the driving unit 1b according to an example of the second embodiment. The driving unit 1b of the example of the second embodiment is different from the driving unit 1a of the example of the first embodiment shown in FIG. 1 in the following points.

① Rather than being integrally projected from the bottom 50 of the fixed casing 11, a trunnion boss 75 is formed as a single part and journaled at its opposite ends between the bottom 50 of the fixed casing 11 and the holder 24;

② The crowned portion is formed in the engaging cog 17c of the first. sun gear 17, rather than being formed in the spline cog 18a of the rotating shaft 16 as in the example of the first embodiment;

③ While in the example of the first embodiment, the first-stage planetary gear train comprises three first planetary gears 20, the first planetary gears 20 in the example of the second embodiment are reduced in number to two;

④ The internal gear 15 is formed to have a reduced length, as compared with the example of the first embodiment; and ⑤ While in the example of the first embodiment, the nut 61 for supporting the bearing 13 is locked against rotation by the key plate 62, the nut is locked against rotation by a pin, instead of the key plate.

In the following, description on the different points mentioned above will be given. First, reference is given to the first difference that the trunnion boss 75 is formed as a single part and journaled at its opposite ends.

In FIG. 14, the trunnion boss 75 is formed as a single part, comprising a large diameter body 75a and two small diameter shafts 75b projecting from the opposite ends of the large diameter body 75a. A hole 76 is formed in the bottom 50 of the fixed casing 11, and a hole 37 is formed in the holder 24 in such a manner as to confront the hole 76. The one shaft 75b of the trunnion boss 75 is fitted in the hole 76 and the other shaft 75b of the same is fitted in the hole 37, whereby the trunnion boss 75 is journaled at its opposite ends between the bottom 50 of the fixed casing 11 and the holder 24. Three trunnion bosses 75 are arranged circumferentially and three second planetary gears 26 engageable between the second sun gear 22 and the internal gear 15 are rotationally supported on the bodies 75a of the three trunnion bosses 75, respectively.

Three support pillars 27 are integrally projected from a portion of the holder 24 between the trunnion bosses 75, and three support pillars 28 are integrally projected from a portion of the fixed casing 11 between the trunnion bosses 75. The support pillars 27 on the holder 24 side and the support pillars 28 on the fixed casing 11 side are put in abutment with each other at their abutment surfaces 29 and are fixed by bolts 30 and locating pins 31. The abutment surfaces 29 are preferably within the width of the second planetary gear 26, or preferably at an approximately center thereof.

By virtue of this supporting structure wherein the trunnion bosses 75 are journaled at the opposite ends between the fixed casing 11 and the holder 24, the trunnion bosses 75 are replaceable with new ones and are supported with little bending. Also, since the abutment surfaces 29 of the support pillars 27 of the holder 24 and those of the support pillars 28 of the fixed casing 11 are located within the width of the second planetary gear 26 and are located at an approximately center thereof, the support pillars 27, 28 can be tightened firmly by the bolts 30. In addition, since the basal ends of the support pillars 27, 28 are integral with the holder 24 or the fixed casing 11, the support pillars can withstand a stress concentration. By virtue of these specific designs, the radial and axial dimension of the fixed casing 11 can be reduced, thus providing a reduced size and weight of the device.

Second, reference is given to the second difference that the crowned portion is formed in the engaging cog 17c of the first sun gear 17, rather than being formed in the spline cog 18a of the rotating shaft 16. FIG. 15(a) is a side view of the first sun gear 17, FIG. 15(b) is a vertically sectioned view, and FIG. 15(c) is a top view showing one of the engaging cogs of the first sun gear. In FIG. 15(c), the opposite slanted surfaces of each engaging cog 17c have a curved surface extending along an arcuate line of a radium R, such that the each engaging cog 17c has a crown shape, protruding at an axial center thereof and gradually narrowing toward the opposite ends. The angle of inclination at the both ends of the engaging cog 17c is $\alpha$. As is the case with the example of the first embodiment of FIG. 10, the rotating shaft is rotated in the state in which the input shaft portion 16b of the rotating shaft 16 is inclined at an angle a at the front end portion thereof by the load F. This inclination of the rotating shaft 16 causes the first sun gear 17 to be inclined. But, since the engaging cogs 17c of the first sun gear 17 are provided with the widthwise crowned portions, the engaging cogs 17c come into abutment with the first planetary gears 20 at their approximately lengthwise center portions thereof.

Thus, all the spline cogs of the rotating shaft 16 are brought into abutment with the first sun gear 17 at the splined connection therebetween. This can prevent a running torque of the rotating shaft from being transmitted by only some spline cogs, and as such can provide improved durability of the rotating shaft 16 and the first sun gear 17. It is to be noted that the cogs of the first sun gear 17 may be tapered as is the case with the front end portion of the rotating shaft 16 of FIG. 13.

Third, reference is given to the third difference that the first planetary gears 20 are reduced in number to two. As shown in FIG. 14, the two first planetary gears 20 are rotatably supported on the planetary gear frame 19 and are engaged between the first sun gear 17 and the internal gear 15.

Figure 16:
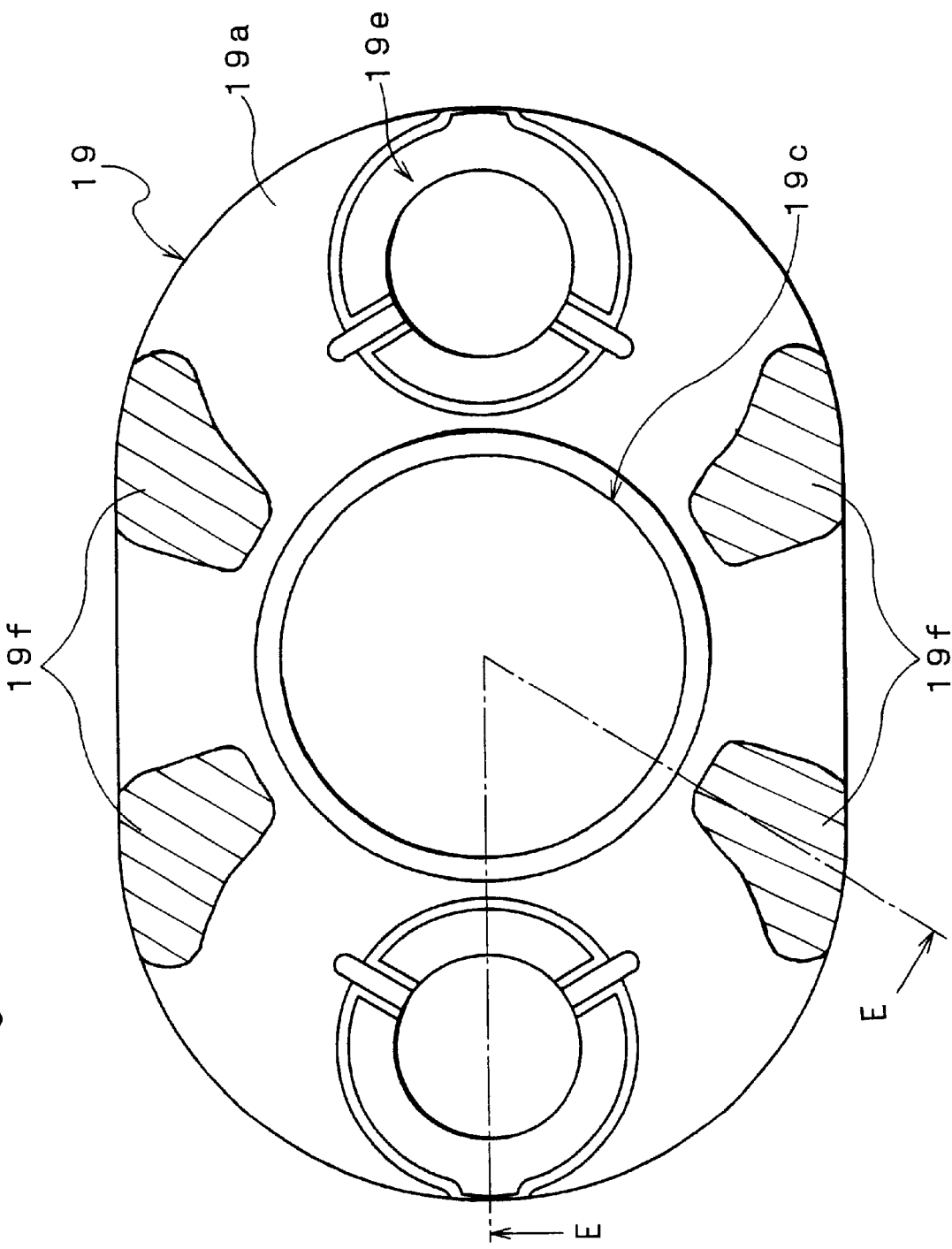
FIG. 16 is a sectional view of a planetary gear frame as viewed from line D—D of FIG. 14.
Figure 17:
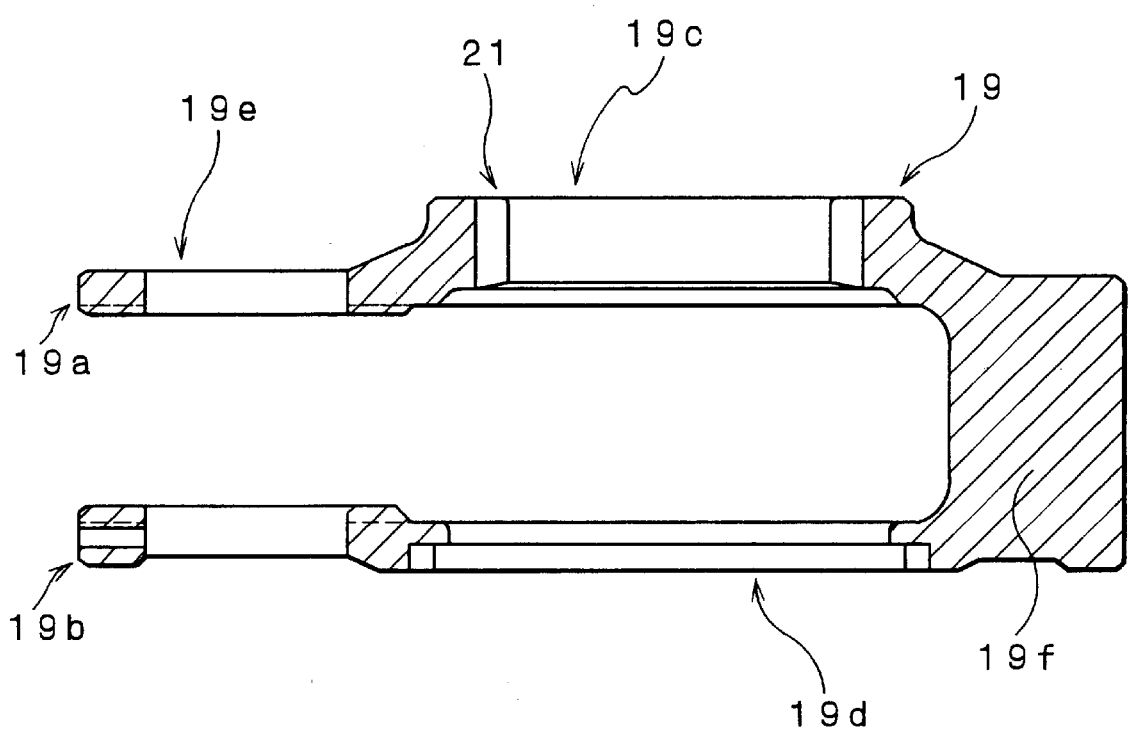
FIG. 17 is a sectional view taken along the arrowed line E—E of FIG. 16, and developed with the hydraulic motor side up.
Figure 18:
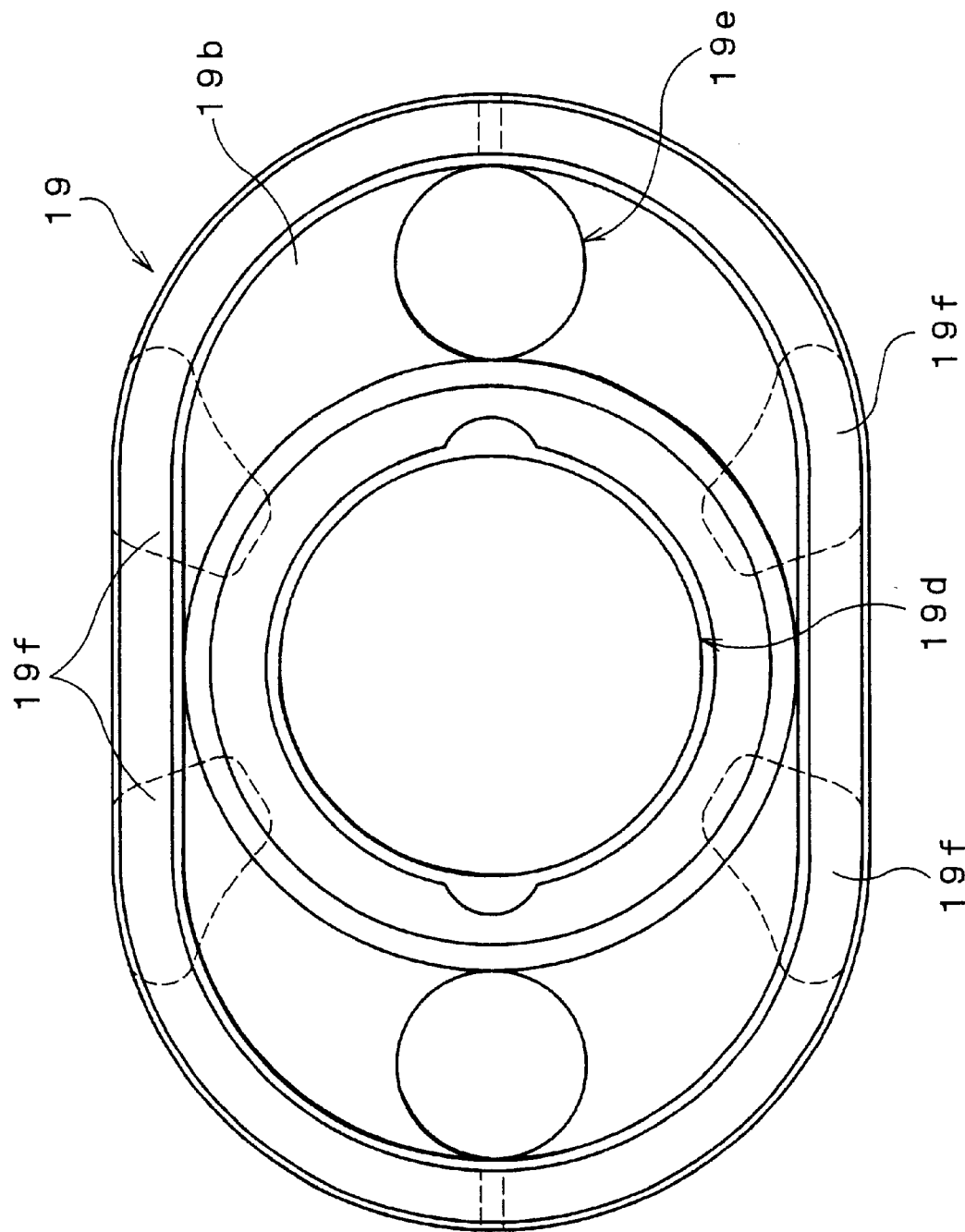
FIG. 18 is a view of the planetary gear frame of the second embodiment of the present invention, as viewed from the opposite side to the hydraulic motor side.

Shown in FIGS. 16–18 is the constitution of the planetary gear frame 19. FIG. 16 is a sectional view of the planetary gear frame 19 as viewed from line D—D of FIG. 14. FIG. 17 is a sectional view taken along the arrowed line E—E of FIG. 16 and developed with the hydraulic motor 3 side up. FIG. 18 is a view of the planetary gear frame 19 as viewed from the opposite side to the hydraulic motor 3 side. As best shown in these. diagrams, the planetary gear frame 19 has a pair of generally ellipse-like flat plate portions 19a, 19b. As best shown in FIG. 16, the flat plate portion 19a has an insertion hole 19c for inserting the rotating shaft 16 therein. As best shown in FIG. 18, the flat plate portion 19b has an opening 19d from which the first sun gear 17 can be fitted onto the rotating shaft 16. The insertion hole 19c has, around its inside, grooves engageable with the periphery of the second sun gear 22 which form the spline 21 (See FIG. 17, not shown in FIG. 16). The opening 19d is closed by a lid 23 after the first sun gear 17 is fitted onto the rotating shaft 16, as shown in FIG. 14.

As best shown in FIGS. 16 and 18, the flat plate portions 19a, 19b have two supporting hole 19e for the two first planetary gears 20 to be supported in such a manner as to be symmetrically disposed about the rotating shaft 16. As shown in FIG. 14, the first planetary gears 20 are mounted on shaft members fitted into the supporting holes 19e. In other words, the two first planetary gears 20 are rotatably supported at the axially opposite ends thereof in sandwich relation between the two flat plate portions 19a, 19b.

When the two first planetary gears 20 are rotated around the first sun gear 17, the reaction forces are applied to the first sun gear 17 from the two first planetary gears 20, respectively. Since the two first planetary gears 20 are symmetrically disposed about the rotating shaft 16, the reaction forces are balanced each other out, and as such can prevent the first sun gear 17 from being moved in the radial direction by the reaction forces. Thus, an undesired partial abutment between the first planetary gears 20 and the first sun gear 17 can be restricted, and as such can provide improved durability of these gears.

The planetary gear frame 19 has paired support pillars 19f for the pair of flat plate portions 19a, 19b to be fixedly held at positions symmetrical with respect to the rotating shaft 16. The two pairs of support pillars 19f extend partially along a generally ellipse-like circumference of the flat plate portions 19a, 19b and are disposed at positions in the vicinity of the first planetary gears 20. The positions of the support pillars 19f enable the support pillars, to which the reaction forces generated when the first planetary gears 20 are driven are applied, to be slenderized. This can produce the driving unit comprising the two first planetary gears combining structural stability with weight reduction.

Thus, the driving unit thus constructed can be reduced in size to a large extent, as compared with the conventional driving unit having three first planetary gears. Further, parts count can also be reduced to a large extent and also the structure can be simplified. Thus, the driving unit thus produced is also excellent in cost. Also, the ellipse-like shape of the planetary gear frame 19 contributes to the downsizing and lightweight of the driving unit.

In addition, the output shaft of the motor is doubled as the input shaft by forming the rotating shaft in one piece and projecting it to extend through a center portion of the reduction gear. This enables the radial movement of the rotating shaft to be reduced, as compared with the rotating shaft comprising the output shaft and the input shaft coupled with each other through an intermediate coupling. As a result of this, undesired partial abutment between the planetary gears and the sun gear can be restricted, and as such can maintain the durability of the sun gear and the rotating shaft.

Further, since the spaces between the cogs of the sun gear and the spline grooves at the fitting portions of the sun gear and the rotating shaft are out of position from each other with respect to the circumferential direction, even when the sun gear is reduced in diameter, the wall thickness of the sun gear can be ensured. As a result of this, deformation of the sun gear produced when it transmits the output can be reduced, so that the noise emitted when the sun gear and the planetary gears are engaged can be suppressed.

Further, as is the case with the example of the first embodiment, the first sun gear can be reduced in radial dimension without the distances between the spline grooves and the spaces between the cogs of the first sun gear being shortened and, as a result, the second sun gear can also be reduced in diameter to such an extent that when the rotating shaft is inclined, the second gear does not interfere with it. This enables the reduction gear ratio of the reduction gear to be increased. As a result of this, a compact, low-torque, high-revolution, hydraulic motor can be applied to the driving unit, then enabling the driving unit to be reduced in size.

Figure 19:
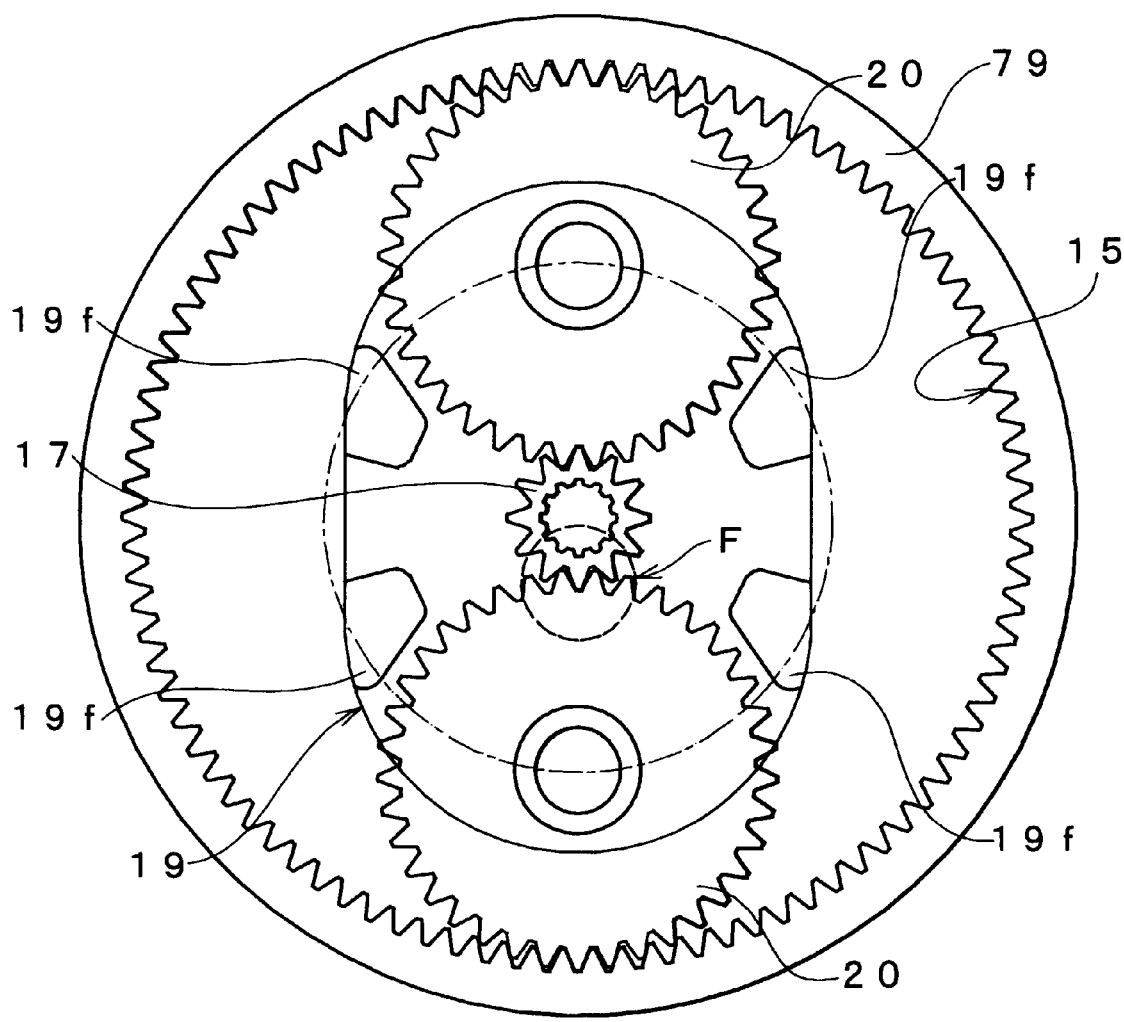
FIG. 19 is a view showing engagement of a sun gear, planetary gears and a internal gear of the second embodiment of the present invention.
Figure 20:
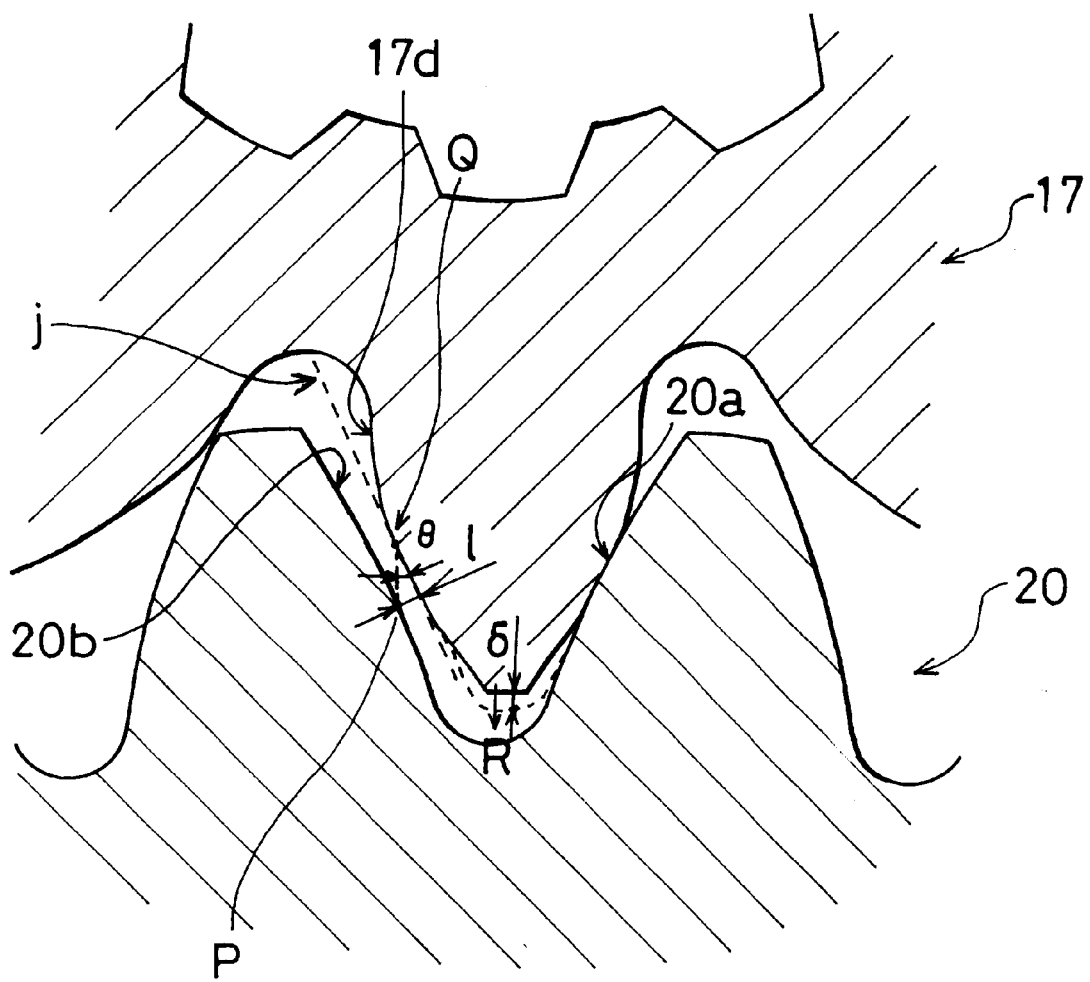
FIG. 20 is an enlarged view of a principal part of FIG. 19.

Here, detailed description will be given on the engagement structure between the first sun gear 17 and the first planetary gears 20 of the driving unit 1b of the example of the second embodiment. FIG. 19 is a view showing the engaging state of the sun gear 17, the first planetary gears 20 and the internal gear 79 having internal cogs 15. FIG. 20 is an enlarged view of a principal part F surrounded by a dotted line of FIG. 19. In FIG. 20, P is a point on a tooth flank 20b of the first planetary gear 20 which is in the opposite side to a tooth flank 20a where the first sun gear 17 and the first planetary gear 20 are put in engagement with each other and which comes nearest the first sun gear 17 when the rotation shaft 16 is inclined, and Q is a point on a tooth flank 17d of the confronting first sun gear 17. A straight line connecting between P and Q is parallel to a connecting line between the axes of the two first planetary gears 20. θ is an angle formed by a tangent line j extending perpendicularly to the axis of the first sun gear 17 and a moving direction R of the first sun gear 17 (the direction of the connecting line P-Q). δ is a distance of the first sun gear 17 in the moving direction R. A distance between the point P and the tangent line, in other words, a clearance 1 between the tooth flank 20b and the tooth flank 17d which is a length of a perpendicular dropped from the point P to the tangent line j is set to 2 δ sin θ.

This can produce the result that even when the rotating shaft 16 is inclined, the tooth flank 17d of the first sun gear 17 and the tooth flank 20b of the first planetary gear 20 are prevented from colliding with each other, thus providing improved durability. Also, since the inclination of the rotating shaft 16 is absorbed between the first sun gear 17 and the first planetary gears 20, inclination of the first planetary gears 20 or second planetary gears 26, partial abutment between the respective gears, and the like adverse effect can be prevented. Further, since a value of the clearance 1 (2 δ sin θ) is a minimum value to prevent the collision between the tooth flake 17d and the tooth flake 20b, the backlash of the first planetary gears 20 resulting from the clearance 1 can be minimized. Thus, undesirable movement of a construction machine using the driving unit of the example of this embodiment resulting from the clearance can be suppressed, so that the construction machine can be prevented from swinging back or slipping down a sloping road.

Fourth, reference is given to the fourth difference that the internal gear 15 is formed to have a reduced length. In FIG. 14, a length of pass of contact n between the first sun gear 17 and the first planetary gears 20 is set to a bending stress calculated to obtain a desired durable period. The bending stress is small in the engaging area between the internal gear 15 and the first planetary gears 20, because tooth thickness of dedendum of the internal gear 15 is formed to be larger than that of dedendum of the first sun gear 17, as shown in FIG. 19. Further, the number of times the internal gear 15 engages with the first planetary gears 20 is smaller than the number of times the first sun gear 17 engages with the first planetary gear 20. Thus, a length of pass of contact m between the internal gear 15 and the first planetary gears 20 can be formed to be smaller than the length of pass of contact n between the first sun gear 17 and the first planetary gears 20. Preferably, the length of pass of contact m should be determined so that the engaging area between the first sun gear 17 and the first planetary gears 20 are equal in durable period to that between the internal gear 15 and the first planetary gear 20.

This can allow the internal gear 15 to be shortened by making the engaging area between the first sun gear 17 and the first planetary gears 20 equal in durable period to that between the internal gear 15 and the first planetary gears 20.

Further, the casing can be reduced in size. Thus, the internal gear and the casing can be reduced in weight and, as a result of this, the hardening treatment of the internal gear can be cut.

Finally, reference is given to the fifth difference that the nut 61 for supporting the bearing 13 is locked against rotation by use of a pin 78, instead of the key plate. In FIG. 14, a projection 77 projecting toward the periphery of the support pillars 28 of the fixed casing 11 is disposed at an end face of the support pillar 27 of the holder 24 at the periphery side thereof, and a lock pin 78 is disposed between the projection 77 and the nut 61 pressing the bearing 13.

Figure 21:
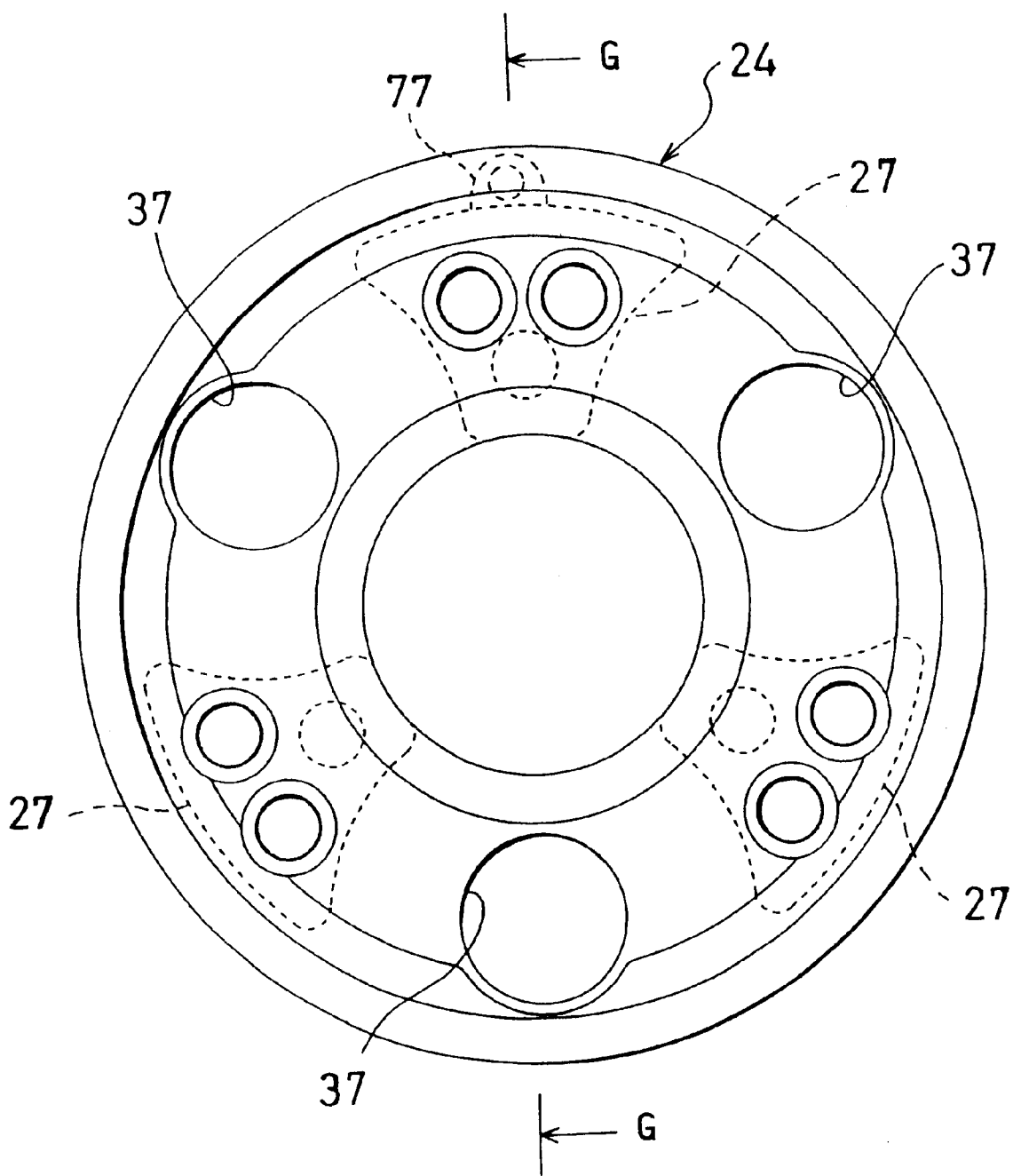
FIG. 21 is a front view of a holder of the second embodiment of the present invention.
Figure 22:
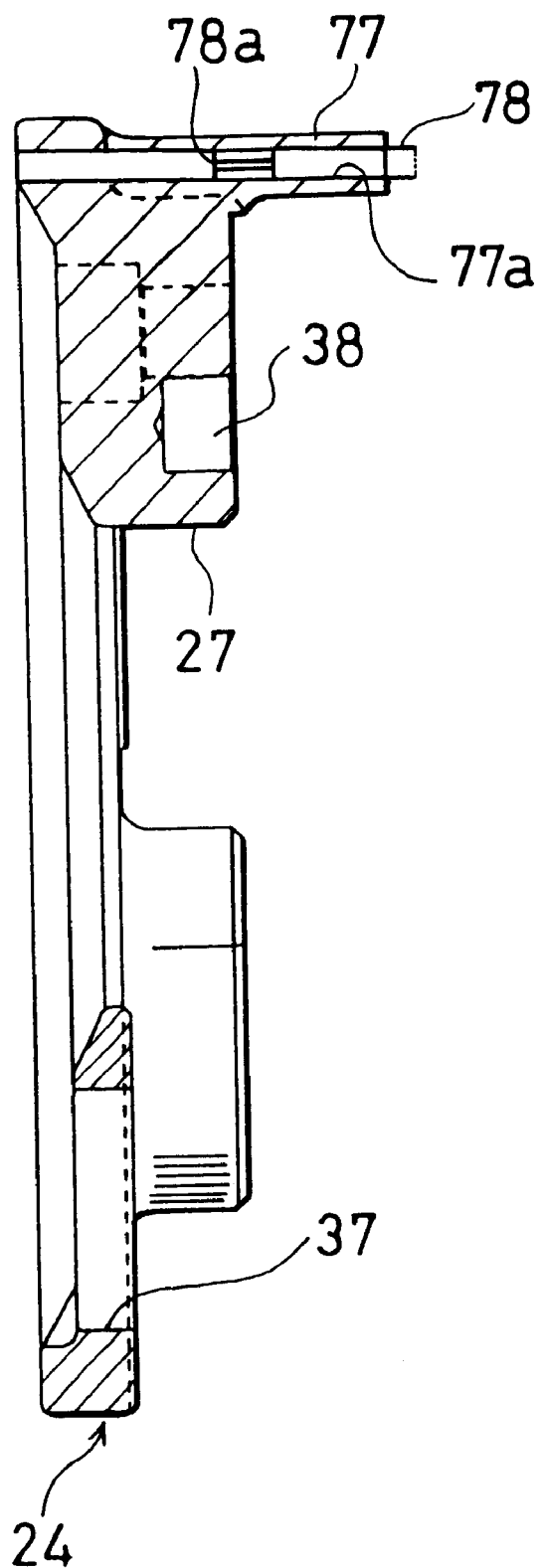
FIG. 22 is a sectional view taken along line G—G of FIG. 21.
Figure 23:
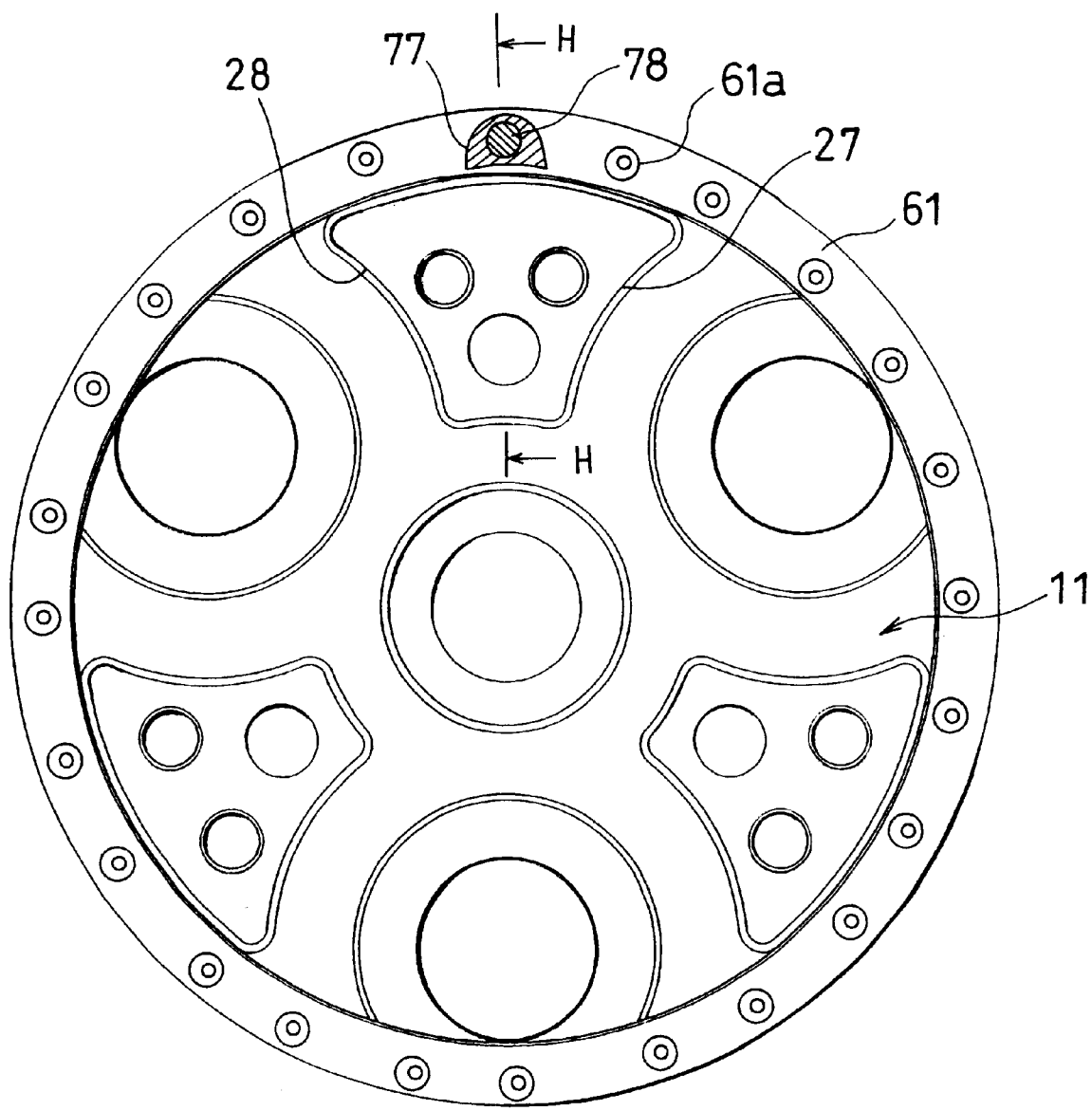
FIG. 23 is a front view of one end face of a fixed casing of the second embodiment of the present invention.

As shown in FIGS. 21 and 22, the projection 77 projected from the holder 24 is integrally projected toward the periphery of the support pillar 27 of the holder 24. The projection 77 has a hole 77a for the pin 78 to be axially inserted. Fitted in the hole 77a is a spring 78a to prevent the pin 78 from falling out. As shown in FIG. 23, pin holes 61a for fitting the pins 78 therein are formed in the side wall of the nut 61, with higher density than those in the example of the first embodiment of FIG. 8.

Figure 24:
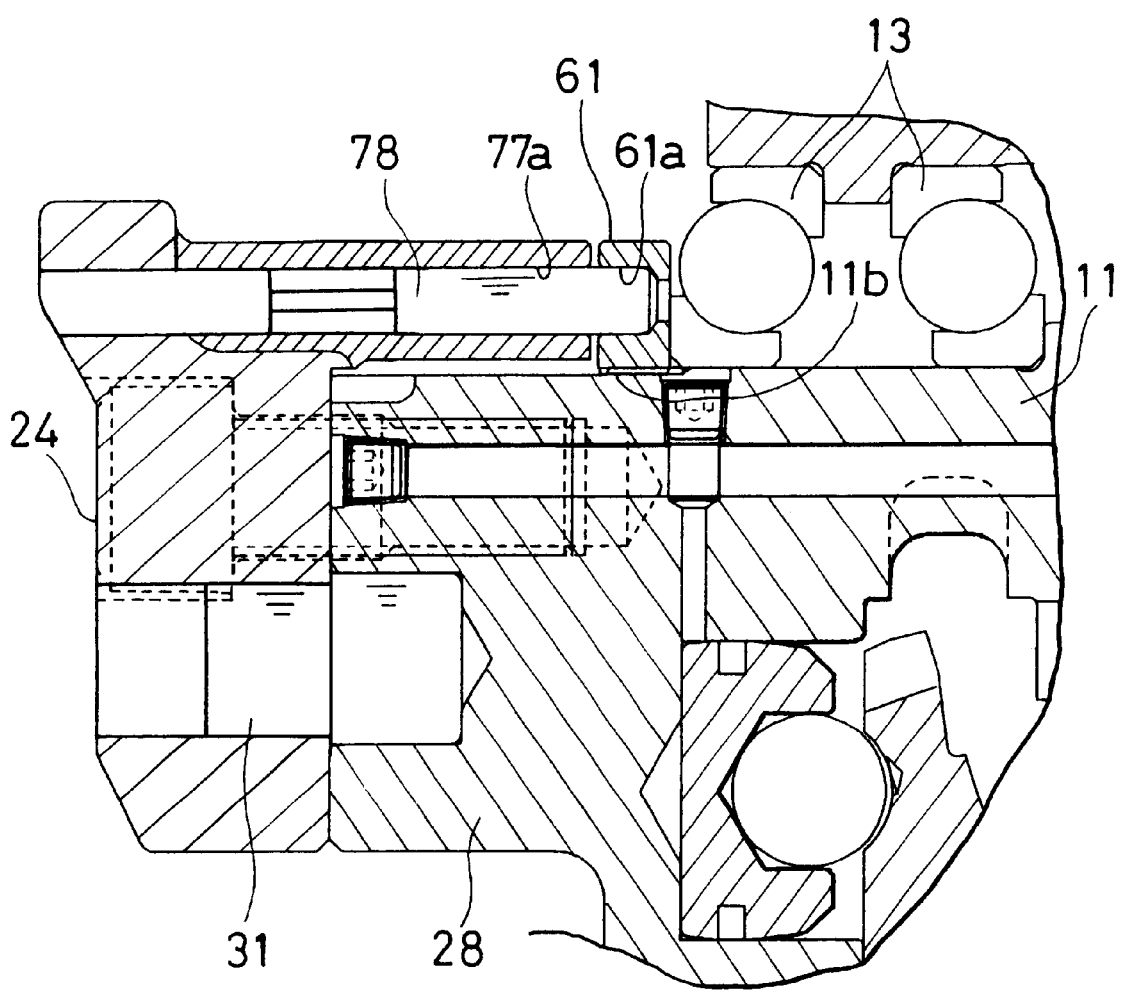
FIG. 24 is a sectional view taken along line H—H of FIG. 23.

As shown in FIG. 24, the nut 61 is screwed into the threaded portion 11b of the fixed casing 11 to press the bearing 13 to a predetermined position. The nut 61 is stopped screwing with the pin hole 61a up, as shown in FIG. 23. Then, the holder 24 is pressed in on the basis of the locating pin 31. At that time, when the pin 78 is previously fitted in either of the holes 77a and 61a, the pin 78 is put into the fitted state shown in the diagram to lock the nut 61 against rotation.

Since no cutout is provided for the support pillar 28 on the fixed casing 11 side, the strength of the support pillar 28 is maintained. In addition, since the key plate 62 is not used in the driving unit of the second embodiment, differently from the driving unit 1a of the example of the first embodiment, the parts count is further reduced and also the axial dimension of the fixed casing 11 is not increased to that extent.

The example of the second embodiment of the invention as described above may be modified as follows, for practical use of the invention.

(1) While in this embodiment, it is only the first planetary gear that comprises two planetary gears, the second planetary gear may also comprise the two planetary gears;

(2) The reduction gear mechanisms that may be used include the one comprising at least a two-stage planetary gear train (e.g. a three-stage or more planetary gear train). Also, the third stage or subsequent stage of planetary gear train that may be used include the one comprising two. or three planetary gears.

(3) The second planetary gears revolving around the second sun gear is not limited in number to three. For example, for four planetary gears, the supporting structure of the embodiment of the present invention can be applied thereto by increasing the trunnion bosses and the support pillars in number to four.

(4) The arrangement of the support pillars for supporting the planetary gear frame is not necessarily limited to the illustrated arrangement wherein two pairs of support pillars are arranged to partially extend along the circumferential direction of the generally ellipse-shaped flat plate portion. For example, a pair of or three pairs of support pillars may be used. Also, the support pillars may be formed into a wall-like configuration arranged to partially along the circumferential direction.

What is claimed is:

1. A driving unit comprising:
a fixed casing having a hydraulic motor therein;
a rotating casing rotatably supported around a periphery of the fixed casing via a bearing inserted from one end portion of the fixed casing and having an internal gear around an inside thereof;
a sun gear mounted on an output shaft projected from the hydraulic motor toward the one end portion of the fixed casing;
a planetary gear train disposed between the sun gear and the internal gear to reduce speed in two or more stages;
a trunnion boss, integrally projected from the one end portion of the fixed casing, for rotatably supporting the planetary gear train of a final stage engaging with the internal gear;
a holder in which a front end portion of the trunnion boss is inserted;
support pillars projecting from the holder toward the fixed casing; and
fastening means for fixing the support pillars and the fixed casing.

2. The driving unit according to claim 1, wherein the support pillars are in abutment with support pillars projected from the fixed casing at their abutment surfaces, which are located within a width of the planetary gear of the final stage.

3. The driving unit according to claim 1, wherein the trunnion boss is projected along a periphery of the fixed casing and a rounded portion is formed at a basal end of the trunnion boss except an area close to the periphery of the fixed casing.

4. The driving unit according to claim 1, wherein the abutment surfaces are located at an approximately widthwise center portion of the planetary gear of the final stage.

5. A driving unit comprising:
a fixed casing having a hydraulic motor therein;
a rotating casing rotatably supported around a periphery of the fixed casing via a bearing inserted from one end portion of the fixed casing and having an internal gear around an inside thereof;
a sun gear mounted on an output shaft projected from the hydraulic motor toward the one end portion of the fixed casing;
a planetary gear train disposed between the sun gear and the internal gear to reduce speed in two or more stages;
a trunnion boss, supported at the one end portion of the fixed casing, for rotatably supporting the planetary gear train of a final stage engaging with the internal gear;
a holder in which a front end portion of the trunnion boss is inserted;
support pillars projecting from the holder toward the fixed casing; and
fastening means for fastening the support pillars and the fixed casing, wherein the support pillars are in abutment with support pillars projected from the fixed casing at their abutment surfaces, which are located within a width of the planetary gear of the final stage.

6. The driving unit according to claim 5, wherein the abutment surfaces are located at an approximately widthwise center portion of the planetary gear of the final stage.

7. A driving unit comprising a hydraulic motor and a planetary gear type of reducer to reduce an output of the hydraulic motor and transmit the reduced output to a driving portion, wherein an output shaft portion of the hydraulic motor and an input shaft portion of the reducer are integrally formed in the form of a single rotating shaft; wherein a sun gear of the reducer is put in spline engagement with a front end portion of the rotating shaft; and wherein the spline is so formed that a clearance therebetween can gradually broaden toward the end thereof.

8. The driving unit according to claim 7, wherein spline grooves are formed around an inside of the sun gear so that they are each located at an approximately circumferential center between adjacent spaces between cogs formed around a periphery of the sun gear.

9. A driving unit comprising a hydraulic motor and a planetary gear type of reducer to reduce an output of the hydraulic motor and transmit the reduced output to a driving portion, wherein an output shaft portion of the hydraulic motor and an input shaft portion of the reducer are integrally formed in the form of a single rotating shaft; wherein a sun gear of the reducer is mounted on a front end portion of the rotating shaft; and wherein at least one of a planetary gear engaging with the sun gear and the sun gear have cogs which are so formed that a clearance therebetween can gradually broaden toward the end thereof.

10. The driving unit according to claim 8, wherein a distance between P and a tangent line touching one tooth flank of the sun gear at a point and extending perpendicularly to an axis of the sun gear is set at a value of not less than and asymptotic to $2 \delta \sin \theta$ when the reducer is in an unloaded state:

where $\delta$ is a maximum radial variation of the sun gear caused by inclination of the rotating shaft; $\theta$ is an angle formed by the tangent line and a moving direction of the sun gear in such a positional relationship that when the rotation shaft is inclined, the one tooth flank of the sun gear which is on the opposite side to the other tooth flank of the sun gear which is put into engagement with the planetary gear comes nearest to a confronting tooth flake of the planetary gear; and P is a point on the confronting tooth flank of the planetary gear closest to the sun gear.

11. A driving unit comprising a hydraulic motor and a planetary gear type of reducer to reduce an output of the hydraulic motor and transmit the reduced output to a driving portion, the driving unit comprising a sun gear coupled with an output shaft portion of the hydraulic motor, planetary gears engaging with the sun gear, and an internal gear engaging with the planetary gears and formed around an inside of a rotating casing of the reducer, wherein a length of pass of contact of the internal gear is shortened so that an engaging area between the planetary gears and the sun gear can be equal in durable period to that between the internal gear and the sun gear.

12. A driving unit comprising:

a fixed casing having a hydraulic motor therein;

a rotating casing rotatably supported around a periphery of the fixed casing via a bearing inserted from one end portion of the fixed casing and having an internal gear around an inside thereof;

a sun gear mounted on an output shaft projected from the hydraulic motor toward the one end portion of the fixed casing; and a planetary gear train disposed between the sun gear and the internal gear to reduce speed, wherein at least one stage of the planetary gear train has two planetary gears symmetrically disposed about the output shaft and a planetary gear frame for rotatably supporting the two planetary gears at both axial ends thereof in sandwich relation, the planetary gear frame having a pair of flat plate portions for supporting the two planetary gears in sandwich relation and support pillars for connecting between the pair of flat plate portions, the support pillars being partially extended along a periphery of the flat plate portions and disposed near the planetary gears.

13. The driving unit according to claim 12, wherein the flat plate portions are formed into a generally ellipse-like shape.

14. A driving unit comprising:

a fixed casing having a hydraulic motor therein;

a rotating casing rotatably supported around a periphery of the fixed casing via a bearing inserted from one end portion of the fixed casing and having an internal gear around an inside thereof;

a sun gear mounted on an output shaft projected from the hydraulic motor toward the one end portion of the fixed casing;

a planetary gear train disposed between the sun gear and the internal gear to reduce speed in two or more stages;

a trunnion boss, disposed at the one end portion of the fixed casing, for rotatably supporting the planetary gear train of a final stage engaging with the internal gear;

a holder in which a front end portion of the trunnion boss is inserted and which is mounted on the fixed casing; and a nut threadedly engaged with the periphery of the fixed casing to position the bearing with respect to an axial direction of the fixed casing; and a pin, disposed between the nut and the holder, for locking the nut against rotation.

15. The driving unit according to claim 14, wherein support pillars projected from the fixed casing and support pillars projected from the holder are fixed in abutment with each other, a projection projecting from the holder along a periphery of the support pillar, and the pin is disposed between the projection and the nut.

* * * * *